United States Patent
Xu

(10) Patent No.: US 12,262,419 B2
(45) Date of Patent: Mar. 25, 2025

(54) METHOD FOR CONFIGURING RANDOM ACCESS CHANNEL RESOURCES, DEVICE AND STORAGE MEDIUM

(71) Applicant: GUANGDONG OPPO MOBILE TELECOMMUNICATIONS CORP., LTD., Guangdong (CN)

(72) Inventor: Weijie Xu, Guangdong (CN)

(73) Assignee: GUANGDONG OPPO MOBILE TELECOMMUNICATIONS CORP., LTD., Guangdong (CN)

( * ) Notice: Subject to any disclaimer, the term of this patent is extended or adjusted under 35 U.S.C. 154(b) by 343 days.

(21) Appl. No.: 17/741,202

(22) Filed: May 10, 2022

(65) Prior Publication Data
US 2022/0272765 A1 Aug. 25, 2022

Related U.S. Application Data

(63) Continuation of application No. PCT/CN2019/118921, filed on Nov. 15, 2019.

(51) Int. Cl.
*H04W 74/0833* (2024.01)
*H04W 72/044* (2023.01)
*H04W 74/00* (2009.01)

(52) U.S. Cl.
CPC ..... *H04W 74/0833* (2013.01); *H04W 72/044* (2013.01); *H04W 74/004* (2013.01)

(58) Field of Classification Search
CPC ........... H04W 74/0833; H04W 72/044; H04W 74/004
See application file for complete search history.

(56) References Cited

U.S. PATENT DOCUMENTS

2019/0380151 A1* 12/2019 Kim ................. H04W 74/0833

FOREIGN PATENT DOCUMENTS

| CN | 102752858 A | 10/2012 |
| CN | 109429345 A | 3/2019 |
| WO | 2019214474 A1 | 11/2019 |
| WO | 2019216708 A1 | 11/2019 |

OTHER PUBLICATIONS

The Search Report of the parallel EP application No. 19952621.1, dated Jul. 1, 2022.
Ericsson, NPRACH range enhancements for NB-IoT, R1-1705186,3GPP TSG-RAN WG1 #88bis, Spokane, USA, Apr. 3-7, 2017.

(Continued)

*Primary Examiner* — Joseph A Bednash
(74) *Attorney, Agent, or Firm* — Ladas & Parry LLP

(57) ABSTRACT

Embodiments of the present application provide a method for configuring random access channel resources, a device and a storage medium, configuration information of random access channel (RACH) resources is sent to a terminal device by a network device, and multiple groups of frequency domain resources are configured for the RACH resources, and the multiple groups of frequency domain resources do not overlap, and in any receiving window for a random access preamble, frequency domain resources corresponding to RACH resources on different time domain resources are different.

20 Claims, 11 Drawing Sheets

(56) References Cited

OTHER PUBLICATIONS

Panasonic, Timing advance and RACH for NTN,R1-1911004, 3GPP TSG RAN WG1 #98bis, Chongqing, China, Oct. 14-20, 2019.
International Search Report (ISR) dated Aug. 18, 2020 for Application No. PCT/CN2019/118921.
MediaTek Inc.:'Improving Random Access in NTN' 3GPP TSG-RAN WG2 Meeting #106 Tdoc R2-1905704 May 17, 2019.
Qualcomm Incorporated:'Evaluations of 2-Rooted PRACH Preamble' 3GPP TSG RAN WG1 #99 R1-1912954 Nov. 9, 2019.
Ericsson:'Remaining details on PRACH formats' 3GPP TSG RAN WG1 Meeting #90bis R1-1718716 Oct. 13, 2017.

* cited by examiner

METHOD FOR CONFIGURING RANDOM ACCESS CHANNEL RESOURCES, DEVICE AND STORAGE MEDIUM

CROSS-REFERENCE TO RELATED APPLICATIONS

The present application is a continuation of International Application No. PCT/CN2019/118921, filed on. Nov. 15, 2019, entitled "METHOD FOR CONFIGURING RANDOM ACCESS CHANNEL RESOURCES, DEVICE AND STORAGE MEDIUM", the content of which is incorporated herein by reference in its entirety.

TECHNICAL FIELD

Embodiments of the present application relate to communication technology, and in particular to a method for configuring random access channel resources, a device and a storage medium.

BACKGROUND

In a random access procedure of a new radio (NR) system, a terminal device sends a random access preamble to a network device through a random access channel (RACH), and the network device can determine a time when the terminal device sends the random access preamble according to a time domain resource of a RACH resource carrying the random access preamble, and further, determines a timing advance (TA) value of the terminal device.

In the NR system, since a coverage area of the network device is small, differences of signal transmission delays between the network device and terminal devices in different positions in a same cell are small. In a random access procedure, the terminal devices in different positions in the same cell may adopt the same RACH resource to send random access preambles, and times that the random access preambles sent by different terminal devices arrive at the network device are within a time corresponding to the same random access channel occasion (RO).

However, in a non-terrestrial network (NTN) system, the coverage area of the network device is large, and therefore, a difference of signal transmission delays between the network device and terminal devices in different positions in a same coverage area is relatively large, resulting in a large time difference when the random access preambles sent by different terminal devices arrive at the network device, in a case where the terminal devices in different positions in the same coverage area adopt the same RACH resource. In order to ensure that the network device can receive random access preambles sent by the terminal devices in different positions in the same coverage area, it is possible to extend a time length of a receiving window for the random access preamble on the network device side. However, the increase of the time length of the receiving window may cause a problem, i.e., if a time interval between adjacent ROs in the time domain is less than the time length of the receiving window, receiving windows corresponding to ROs at different times will overlap in the time domain. If the network device receives a random access preamble in the overlapping area of a plurality of receiving windows, the network device would not be able to determine in which RO the random access preamble was sent by the terminal device, and thus the network device would not be able to determine a TA of the terminal device.

SUMMARY

The embodiments of the present application provide a method for configuring random access channel resources, a device and a storage medium, so as to solve the problem of ambiguity in a receiving window for a random access preamble due to the increase of a time length of the receiving window for the random access preamble on a network device side in an NTN system.

In a first aspect, an embodiment of the present application can provide a method for configuring random access channel resources, applied to a terminal device, where the method includes:

receiving configuration information sent by a network device, where the configuration information is used to configure time domain resources and frequency domain resources of the random access channel RACH resources, the RACH resources correspond to multiple groups of frequency domain resources, the multiple groups of frequency domain resources do not overlap, and frequency domain resources corresponding to RACH resources on different time domain resources are different within a preset time, where the preset time is used to receive a random access preamble; and sending the random access preamble to the network device on the RACH resources.

In a second aspect, an embodiment of the present application can provide a method for configuring random access channel resources, applied to a network device, where the method includes:

sending configuration information to the terminal device, where the configuration information is used to configure time domain resources and frequency domain resources of the random access channel RACH resources, the RACH resources correspond to multiple groups of frequency domain resources, the multiple groups of frequency domain resources do not overlap, and frequency domain resources corresponding to RACH resources on different time domain resources are different within a preset time, where the preset time is used to receive a random access preamble; and receiving the random access preamble sent by the terminal device.

In a third aspect, an embodiment of the present application can provide a method for configuring random access channel resources, applied to a terminal device, where the method includes:

receiving configuration information sent by a network device, where the configuration information is used to configure time domain resources and frequency domain resources of the random access channel RACH resources, the configuration information is further used to configure a plurality of initial preamble root sequences, RACH resources on different time domain resources correspond to different initial preamble root sequences within a preset time, where the preset time is used to receive a random access preamble;

sending the random access preamble to the network device on the RACH resources.

In a fourth aspect, an embodiment of the present application can provide a method for configuring random access channel resources, applied to a network device, where the method includes:

sending configuration information to the terminal device, where the configuration information is used to configure time domain resources and frequency domain resources of the random access channel RACH resources, the configuration information is further used to configure a plurality of initial preamble root sequences, RACH resources on different time domain resources correspond to different initial preamble root sequences within a preset time, where the preset time is used to receive a random access preamble;

receiving the random access preamble sent by the terminal device.

In a fifth aspect, an embodiment of the present application provides a terminal device, including:

a receiving module, configured to receive configuration information sent by a network device, where the configuration information is used to configure time domain resources and frequency domain resources of the random access channel RACH resources, the RACH resources correspond to multiple groups of frequency domain resources, the multiple groups of frequency domain resources do not overlap, and frequency domain resources corresponding to RACH resources on different time domain resources are different within a preset time, where the preset time is used to receive a random access preamble;

a sending module, configured to send the random access preamble to the network device on the RACH resources.

In a sixth aspect, an embodiment of the present application provides a network device, including:

a sending module, configured to send configuration information to the terminal device, where the configuration information is used to configure time domain resources and frequency domain resources of the random access channel RACH resources, the RACH resources correspond to multiple groups of frequency domain resources, the multiple groups of frequency domain resources do not overlap, and frequency domain resources corresponding to RACH resources on different time domain resources are different within a preset time, where the preset time is used to receive a random access preamble;

a receiving module, configured to receive the random access preamble sent by the terminal device.

In a seventh aspect, an embodiment of the present application provides a terminal device, including:

a receiving module, configured to receive configuration information sent by a network device, where the configuration information is used to configure time domain resources and frequency domain resources of the random access channel RACH resources, the configuration information is further used to configure a plurality of initial preamble root sequences, RACH resources on different time domain resources correspond to different initial preamble root sequences within a preset time, where the preset time is used to receive a random access preamble;

a sending module, configured to send the random access preamble to the network device on the RACH resources.

In an eighth aspect, an embodiment of the present application provides a network device, including:

a sending module, configured to send configuration information to the terminal device, where the configuration information is used to configure time domain resources and frequency domain resources of the random access channel RACH resources, the configuration information is further used to configure a plurality of initial preamble root sequences, RACH resources on different time domain resources correspond to different initial preamble root sequences within a preset time, where the preset time is used to receive a random access preamble;

a receiving module, configured to receive the random access preamble sent by the terminal device.

In a ninth aspect, an embodiment of the present application provides a terminal device, including:

a processor, a memory, and a communication interface;

the memory stores computer-executable instructions;

the processor executes the computer-executable instructions stored in the memory, causing the processor to execute the method according to the first aspect or the third aspect.

In a tenth aspect, an embodiment of the present application provides a network device, including:

a processor, a memory, and a communication interface;

the memory stores computer-executable instructions;

the processor executes the computer-executable instructions stored in the memory, causing the processor to execute the method according to the second aspect or the fourth aspect.

In an eleventh aspect, an embodiment of the present application provides a computer readable storage medium storing computer-executable instructions, when the computer-executable instructions are executed by a processor, the method according to the first aspect, the second aspect, the third aspect or the fourth aspect is implemented.

In a twelfth aspect, an embodiment of the present application provides a chip including a processor for calling and running a computer program from a memory, so as to enable a device on which the chip is installed to execute the method according to the first aspect, the second aspect, the third aspect or the fourth aspect.

In a thirteenth aspect, an embodiment of the present application provides a computer program product including computer program instructions that cause a computer to execute the method according to the first aspect, the second aspect, the third aspect or the fourth aspect.

In a fourteenth aspect, an embodiment of the present application further provides a computer program that causes a computer to execute the method according to the first aspect, the second aspect, the third aspect or the fourth aspect.

According to a method for configuring random access channel resources, a device and a storage medium provided by the embodiments of the present application, configuration information of RACH resources is sent to a terminal device by a network device, and multiple groups of frequency domain resources are configured for the RACH resources, and the multiple groups of frequency domain resources do not overlap, and in any receiving window for a random access preamble, frequency domain resource groups corresponding to RACH resources on different time domain resources are different, so as to make it possible to determine a time domain resource of a RACH resource according to a frequency domain resource corresponding to the RACH resource in a same receiving window, such that when the network device receives a random access preamble sent by the terminal device, the network device can determine, according to a frequency domain resource of a RACH resource corresponding to the random access preamble, a time domain resource of the RACH resource, and can determine a sending time of the random access preamble sent by the terminal device according to the time domain resource of the RACH resource, and further determine, according to a receiving time when the network device receives the random access preamble and the sending time when the terminal device sends the random access preamble, a TA of the terminal device, thus solving the problem of ambiguity in the receiving window for the random access preamble due to the increase of the time length of the receiving window for the random access preamble on the network device side in an NTN system.

BRIEF DESCRIPTION OF THE DRAWINGS

In order to explain the embodiments of the present application or technical solutions in the prior art more clearly, in the following, the drawings that need to be used in the description of the embodiments or the prior art will be briefly introduced. Obviously, the drawings in the following description are some embodiments of the present application, and for ordinary technicians in this field, other drawings can be obtained according to these drawings without paying creative effort.

DESCRIPTION OF EMBODIMENTS

Figure 1:
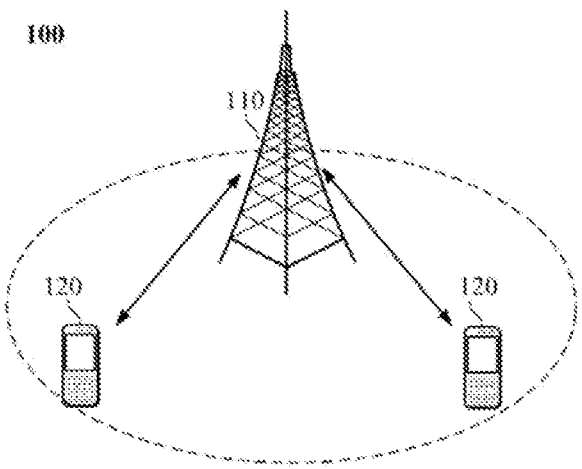
FIG. 1 is a schematic diagram of a communication system provided by the present application.

In order to make the purpose, technical solutions and advantages of the present application embodiment clearer, technical solutions in embodiments of the present application will be clearly and completely described below with reference to the drawings in the embodiments of the present application. Obviously, the described embodiments are part of the embodiments of the present application, rather than all of the embodiments. Based on the embodiments in the present application, all other embodiments obtained by those of ordinary skill in the art without creative labor belong to the protection scope of the present application.

The terms "first", "second" and the like in the specification, claims and the above drawings of the embodiments of the present application are used to distinguish similar objects, and are not necessarily used to describe a specific order or sequence. It should be understood that the data thus used can be interchanged in appropriate circumstances, so that the embodiments of the present application described herein can be implemented in an order other than those illustrated or described herein, for example. In addition, the terms "include" and "have" and any variations thereof are intended to cover non-exclusive inclusion, for example, processes, methods, systems, products or devices containing a series of steps or units need not be limited to those steps or units explicitly listed, but may include other steps or units not explicitly listed or inherent to these processes, methods, products or devices.

The technical solutions in the embodiments of the present application are described below with reference to the accompanying drawings of the embodiments of the present application. Obviously, the described embodiments are part of the embodiments of the present application, rather than all of the embodiments. Based on the embodiments in the present application, all other embodiments obtained by those of ordinary skill in the art without paying creative labor belong to the protection scope of the present application.

The technical solutions of the embodiments of the present application can be applied to various communication systems, such as a global system of mobile communication (GSM) system, a code division multiple access (CDMA) system, a wideband code division multiple access (WCDMA) system, a general packet radio service (GPRS) system, a long term evolution (LTE) system, an LTE frequency division duplex (FDD) system, an LTE time division duplex (TDD) system, an advanced long term evolution (LTE-A) system, a new radio (NR) system, an evolution system of NR system, an LTE-based access to unlicensed spectrum (LTE-U), an NR-based access to unlicensed spectrum (NR-U) system, a universal mobile telecommunication system (UMTS), a worldwide interoperability for microwave access (WiMAX) communication system, wireless local area networks (WLAN) system, a wireless fidelity (WiFi) system, a next generation communication system or other communication systems, etc.

Generally speaking, the traditional communication system supports a limited number of connections and is easy to be implemented. However, with the development of communication technology, the mobile communication system will not only support traditional communication, but also support, for example, device-to-device (D2D) communication, machine-to-machine (M2M) communication, machine type communication (MTC), vehicle-to-vehicle (V2V) communication, etc. The embodiments of the present application can also be applied to these communication systems.

Illustratively, a communication system 100 applied in the embodiments of the present application is shown in FIG. 1. The communication system 100 may include a network device 110, which may be a device that communicates with a terminal device 120 (or called a communication terminal or a terminal). The network device 110 can provide communication coverage for a specific geographical area, and can communicate with terminals device located in the coverage area. In an embodiment, the network device 110 may be a base station (Base Transceiver Station, BTS) in a GSM system or a CDMA system, a base station (NodeB, NB) in a WCDMA system, or may also be an evolved base station (Evolutional Node B, eNB or eNodeB) in an LTE system, or a wireless controller in a cloud radio access network (CRAN). Or the network device can be a mobile switching center, a relay station, an access point, a vehicle-mounted device, a wearable device, a hub, a switch, a bridge, a router, a network side device in a 5G network or network device in a future evolved public land mobile network (PLMN), etc.

The communication system 100 also includes at least one terminal device 120 located within the coverage area of the network device 110. As used herein, a "terminal" includes but is not limited to devices connected via wired lines, such as connected via public switched telephone networks (PSTN), digital subscriber line (DSL), digital cable and direct cable; and/or devices connected via another data connection/network; and/or devices connected via a wireless interface, such as devices connected via a cellular network, a WLAN, a digital television network such as a DVB-H network, a satellite network, an AM-FM broadcast transmitter; and/or an apparatus of another terminal device arranged to receive/send communication signals; and/or internet of things (IoT). A terminal device arranged to communicate through a wireless interface may be referred to as a "wireless communication terminal", a "wireless terminal" or a "mobile terminal". Examples of mobile terminals include but are not limited to satellites or cellular phones; personal communications system PCS) terminal which can combine a cellular radio telephone with data processing, fax and data communication capabilities; a personal digital assistant (PDA) device that may include radio telephones, beepers, internet/intranet access, Web browsers, notebooks, calendars, and/or global positioning system (GPS) receivers; and conventional laptop and/or palmtop receivers or other electronic devices including radio telephone transceivers. Terminal devices may refer to access terminals, user equipments (UE), user units, user stations, mobile stations, mobile terminations, remote stations, remote terminals, mobile devices, user terminals, terminals, wireless communication devices, user agents or user apparatuses. Access terminals may be cellular phones, cordless phones, session initiation protocol (SIP) phones, wireless local loop (WLL) stations, PDA devices, handheld devices with a wireless communication function, computing devices or other processing devices connected to wireless modems, vehicle-mounted devices, wearable devices, terminal devices in 5G network or terminal devices in future evolved PLMN, etc.

In an embodiment, D2D communication can be performed between terminal devices 120.

In an embodiment, the 5G system can also be called an NR system, or the 5G network can also be called an NR network.

FIG. 1 exemplarily shows one network device and two terminal devices. In an embodiment, the communication system 100 may include multiple network devices and other numbers of terminal devices may be included in the coverage area of each network device, which is not limited by the embodiments of the present application.

In FIG. 1, the network device may be an access device, for example, an access device in an NR-U system, such as a 5G NR base station (next generation Node, gNB) or a small station, a micro station, a relay station, a transmission and reception point (TRP), a road side unit (RSU), etc.

Terminal devices may refer to access terminals, UEs, access terminals, user units, user stations, mobile stations, mobile terminations, user terminals, terminals, wireless communication devices, user agents or user apparatuses. Specifically, it can be a smartphone, a cellular phone, a cordless phone, a PDA device, a handheld device with a wireless communication function or other processing devices connected to a wireless modem, a vehicle-mounted device, a wearable device, etc. In the embodiments of the present application, the terminal device has an interface to communicate with network devices (such as cellular networks).

In an embodiment, the communication system 100 may also include other network entities such as a network controller, a mobility management entity, etc., which is not limited by the embodiments of the present application.

It should be understood that devices with communication functions in the network/system in the embodiments of the present application can be called communication devices. Taking the communication system 100 shown in FIG. 1 as an example, the communication devices may include a network device 110 and terminal devices 120 with communication functions, and the network device 110 and the terminal devices 120 may be the specific devices described above, which will not be repeated herein. Communication devices may also include other devices in the communication system 100, such as network controllers, mobility management entities and other network entities, which are not limited in the embodiments of the present application.

It should be understood that the terms "system" and "network" are often used interchangeably herein. The term "and/or" herein, which is only the associated relationship describing the associated objects, indicates that there can be three kinds of relationships, for example, A and/or B, which can indicate that A exists alone, A and B exist at the same time, and B exists alone. In addition, the character "/" herein generally indicates that the context object is an "or" relationship.

Figure 2:
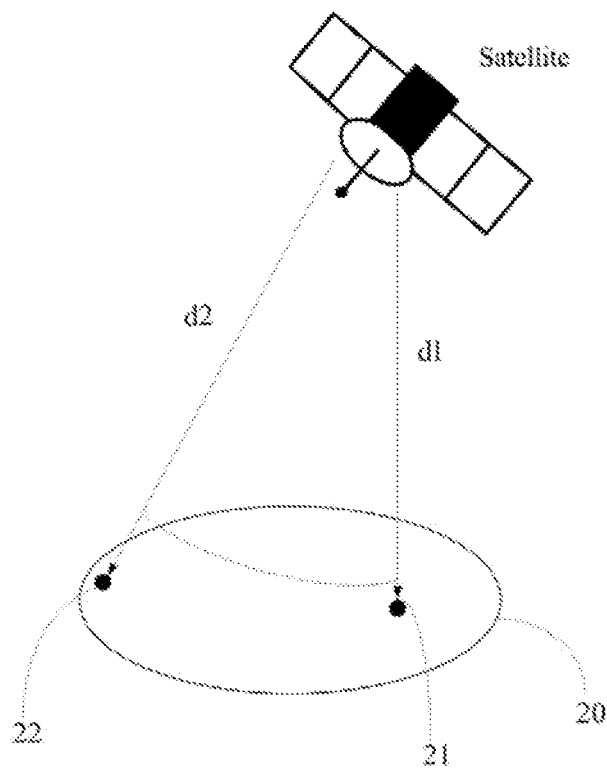
FIG. 2 is a schematic diagram of an NTN communication system provided by the present application.

Methods of the embodiments of the present application can be applied to the communication system as shown in FIG. 1, and can also be applied to other communication scenarios. For example, it can also be applied to an NTN system as shown in FIG. 2. The satellite can be used as a network device to provide communication services to terminal devices on the ground. Compared with terrestrial cellular network communication, satellite communication has many advantages, for example, satellite communication is not limited by region, and its coverage area is larger. As shown in FIG. 2, 20 represents a coverage area of the satellite, in which a plurality of terminal devices may exist. The coverage area can be an area covered by one or more beams of the satellite, a part of the area covered by the one or more beams of the satellite, or an area with the same cell level as the NR system. A plurality of coverage areas of the satellite can constitute the coverage area of the satellite.

As shown in FIG. 2, 21 represents a reference point in the coverage area. Specifically, the reference point can be a point closest to the satellite in the coverage area, and the reference point 21 can also be regarded as a near end. 22 represents any point in the coverage area except the reference point. For example, 22 represents a point farthest from the satellite in the coverage area. In this case, the point 22 can also be regarded as a far end. d1 represents a distance between the near end and the satellite, and d2 represents a distance between the far end and the satellite. Assuming that a terminal device A is located at the near end and a terminal device B is located at the far end, a signal transmission delay between the terminal device A and the satellite is recorded as T1, and a signal transmission delay between the terminal device B and the satellite is recorded as T2. The difference between T2 and T1 is the maximum difference of signal transmission delays between the network device and the terminal devices in different positions in the same coverage area. In the NTN system, since the terminal device is far away from the satellite, the difference of the signal transmission delays between the network device and the terminal devices at different positions in the same coverage area is larger than that of different terminal devices in terrestrial cellular network communication. Where the signal transmission delay can specifically be a signal round-trip transmission delay or a signal one-way transmission delay, which is not specifically limited herein.

In some scenarios, the terminal device needs to perform random access, that is, the terminal device needs to establish a wireless connection with the network device. Specifically, the terminal device can perform random access through two random access modes, one is a competition-based random access mode and the other is a non-competition-based random access mode, both of which are introduced separately in the following.

Figure 3:
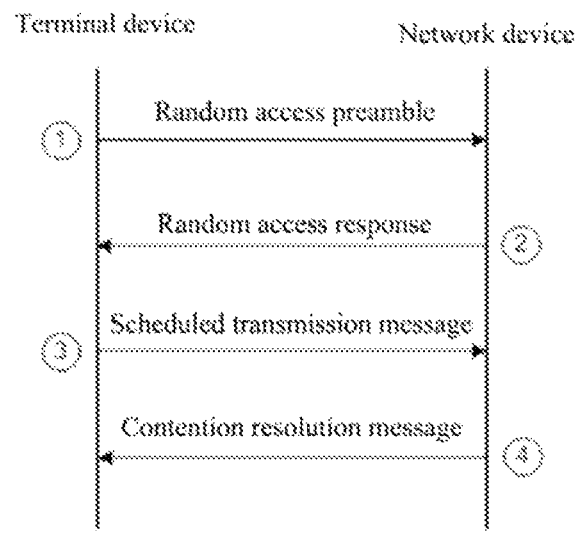
FIG. 3 is a schematic diagram of a competition-based random access procedure in the prior art.

As shown in FIG. 3, the competition-based random access mode specifically includes the following four steps. Step 1, a terminal device sends a random access preamble to a network device, where the random access preamble can specifically be a preamble sequence selected by the terminal from a specified set. Step 2, the network device sends a random access response (Random Access Response) to the terminal device, where the random access response may include a preamble sequence identifier, a TA value, a back-off, an initial uplink resource transmission grant (UL-grant), and a Cell-RadioNetworkTemporaryIdentifier (C-RNTI). Step 3, the terminal device sends a scheduled transmission message to the network device. Step 4, the network device sends a contention resolution message to the terminal device.

Figure 4:
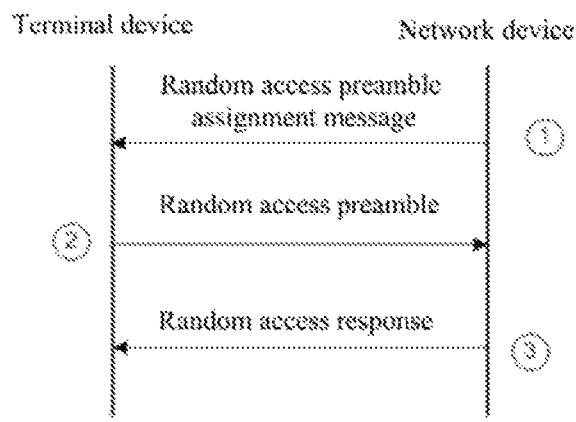
FIG. 4 is a schematic diagram of a non-competition-based random access procedure in the prior art.

As shown in FIG. 4, the non-competition-based random access mode specifically includes the following three steps. Step 1, a network device sends a random access preamble assignment message to a terminal device. Step 2, the terminal device sends a random access preamble to the network device. Step 3, the terminal device sends a random access response to the network device.

In the NR system, the coverage area of the network device is small, the difference of signal transmission delays between the network device and terminal devices in different positions in the same cell is relatively small. In a random access procedure, terminal devices in different positions in the same cell may use the same RACH resource to send random access preambles, and times that the random access preambles sent by different terminal devices arrive at the network device are within a time corresponding to the same RO. Where one RACH resource may be an RO. When the network device receives the random access preamble sent by the terminal device, it can determine a time when the terminal device sends the random access preamble, so as to make it possible to determine a TA of the terminal device and a random access radio network temporary identifier (RA-RNTI) used by the network device to send a random access response to the terminal device. Where the RA-RNTI is related to the RACH resource used by the terminal device when sending the random access preamble. The RA-RNTI is used to scramble a physical downlink control channel (PDCCH), a PDCCH is used to schedule a physical downlink shared channel (PDSCH), and a PDSCH is used to carry a random access response.

Compared with the NR system, the signal transmission delay between the terminal device and the satellite in an NTN system is greatly increased. In addition, the satellite covers a large area, and there is a great difference in signal transmission delays between the satellite and the terminal devices in different positions in the same coverage area. As a result, when the terminal devices in different positions in the same coverage area use the same RACH resource to send random access preambles, the time difference between the random access preambles sent by different terminal devices reaching the network device is relatively large. In order to ensure that the network device can receive random access preambles sent by the terminal devices in different positions in the same coverage area, it is possible to extend a time length of the receiving window for the random access preamble on the network device side. In this embodiment and subsequent embodiments, the receiving window for random access preambles can be simply referred to as the receiving window.

Figure 5:
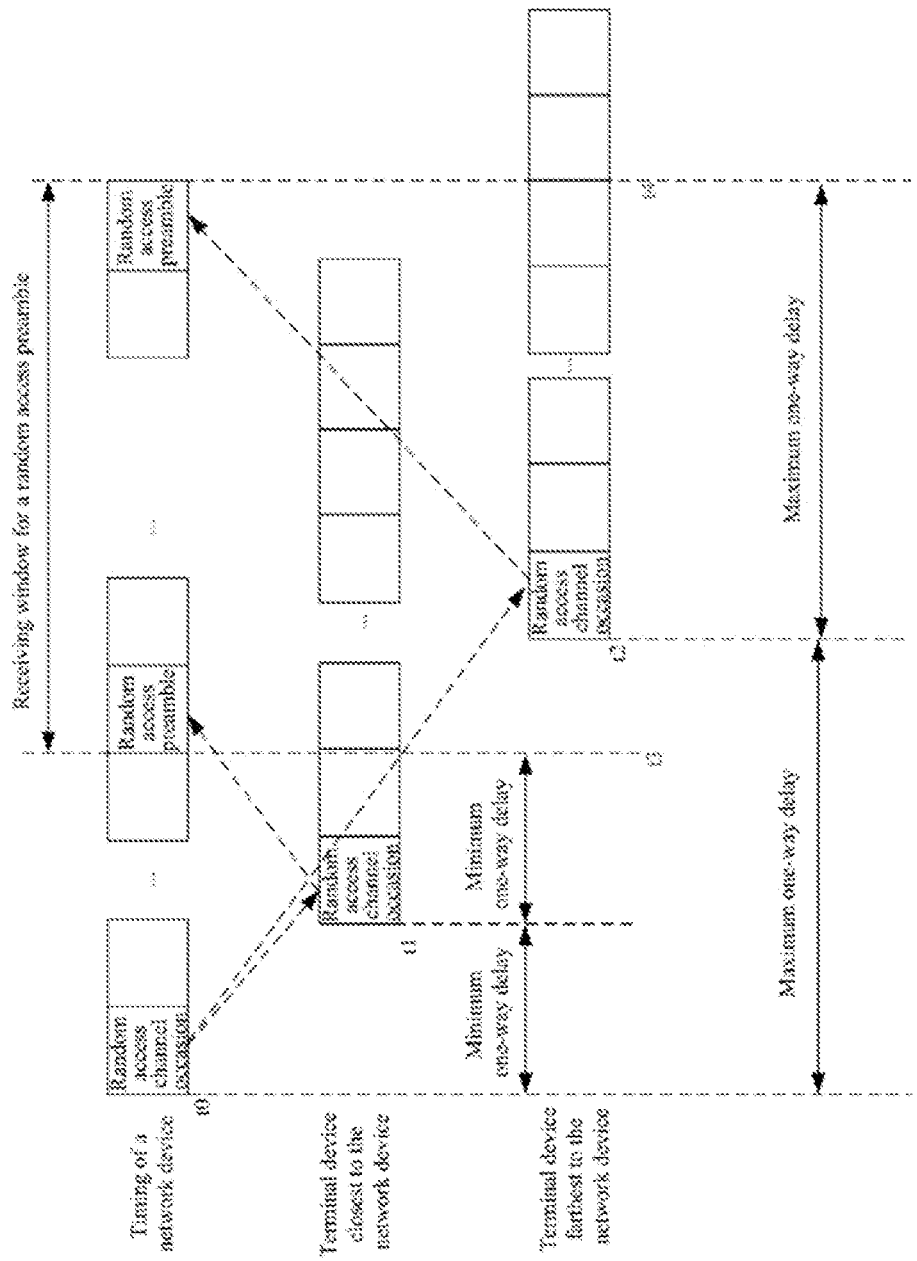
FIG. 5 is a schematic diagram of a receiving window for a random access preamble in the prior art.

In the NTN system, there is a deviation in downlink timing between the network device and the terminal device, therefore a decision time corresponding to an RO on the network device side and a decision time corresponding to an RO on the terminal device side at the same time are different. As shown in FIG. 5, the decision time of the RO at the same time on the network device side is t0, the decision time corresponding to the RO on the terminal device side closest to the network device is t1, and the decision time corresponding to the RO on the terminal device side farthest from the network device is t2. Where a time length between the moment t0 and the moment t1 is the minimum one-way delay, and a time length between the moment t0 and the moment t2 is the maximum one-way delay. Here, the one-way delay is specifically the signal one-way transmission delay as described above.

Furthermore, the terminal device closest to the network device sends a random access preamble to the network device at the moment t1, and the random access preamble arrives at the network device at a moment t3. The terminal device farthest from the network device sends a random access preamble to the network device at the moment t2, and the network device completes receiving of the random access preamble at a moment t4. Where a time length between the moment t1 and the moment t3 is the minimum one-way delay, and a time length between the moment t2 and the moment t4 is the maximum one-way delay. In order to ensure that the network device can receive random access preambles sent by terminal devices in different positions in the same coverage area, the time length of the receiving window for the random access preamble on the network device side needs to be extended to 2*(maximum one-way delay−minimum one-way delay), i.e., twice of the difference between the maximum one-way delay and the minimum one-way delay. That is, if different terminal devices located in the same coverage area use the same RO to send random access preambles, the random access preambles sent by different terminal devices will reach the network device within the receiving window for the random access preamble as shown in FIG. 5. Similarly, if the network device receives a random access preamble in the receiving window for the random access preamble, it is determined that the random access preamble is sent through the RO. That is, each RO can correspond to a receiving window for the random access preamble.

Figure 6:
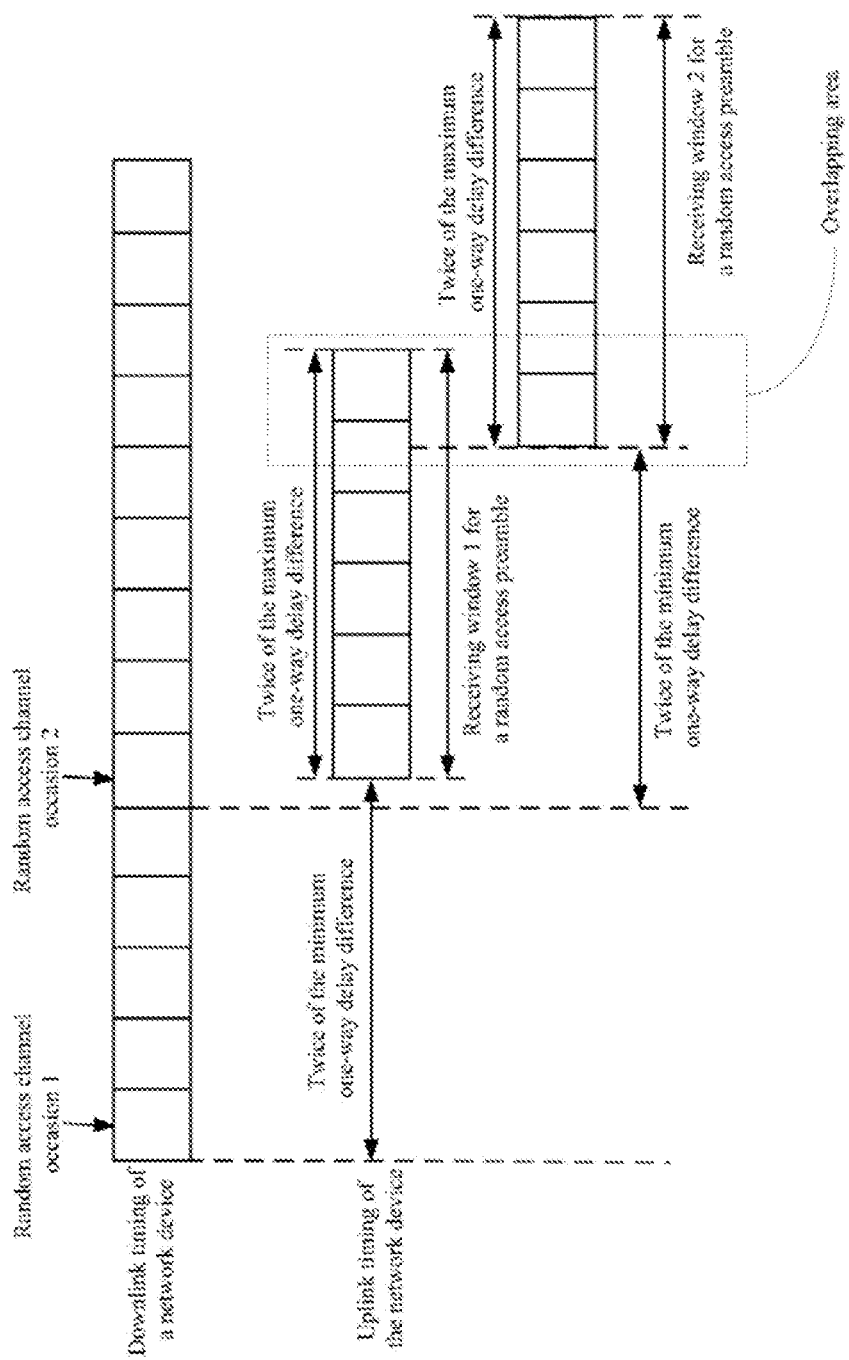
FIG. 6 is a schematic diagram of ambiguity in a receiving window for a random access preamble in the prior art.

However, the increase of the time length of the receiving window for the random access preamble may cause a problem. As shown in FIG. 6, a random access channel occasion 1 and a random access channel occasion 2 are two ROs adjacent in the time domain, a receiving window 1 for a random access preamble is a receiving window corresponding to the random access channel occasion 1 and a receiving window 2 for a random access preamble is a receiving window corresponding to the random access channel occasion 2. Where the lengths of the receiving window 1 for the random access preamble and the receiving window 2 for the random access preamble are both twice of the difference between the maximum one-way delay and the minimum one-way delay as described above. However, if a time interval between the random access channel occasion 1 and the random access channel occasion 2 is less than the receiving length, i.e., the time length of the receiving window, it will cause the receiving window 1 for the random access preamble and the receiving window 2 for the random access preamble to overlap in the time domain, shown as the overlapping area in FIG. 6. That is, the network device side will encounter a problem of ambiguity in receiving window for the random access preamble. If the network device receives a random access preamble in the overlapping area of a plurality of receiving windows, the network device would not be able to determine in which RO the random access preamble was sent by the terminal device, and thus the network device would not be able to determine a TA of the terminal device. In order to solve this problem, this embodiment provides a method for configuring random access channel resources, which will be introduced below with specific embodiments.

Figure 7:
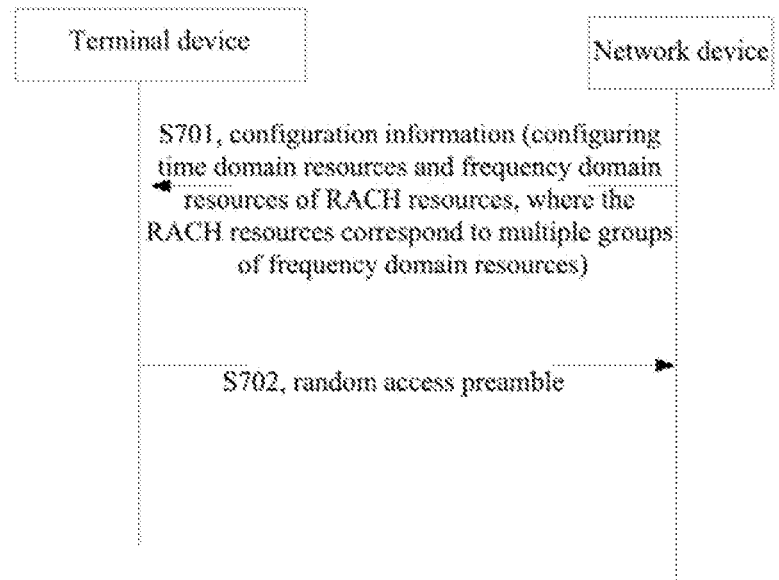
FIG. 7 is a flow chart of a method for configuring random access channel resources provided by the present application.

FIG. 7 is a flow chart of a method for configuring random access channel resources provided by the present application. As shown in FIG. 7, the method for configuring random access channel resources includes the following steps:

S701, a terminal device receives configuration information sent by a network device.

In the embodiment of the present application, the terminal device(s) and the network device can be communication devices in an NTN system. That is, the method described in the embodiment of the present application can be applied to an NTN system. Specifically, before the terminal device sends a random access preamble to the network device, the network device sends configuration information to the terminal device, and the terminal device receives the configuration information. The configuration information is used to configure time domain resources and frequency domain resources of the random access channel RACH resources, where the RACH resources correspond to multiple groups of frequency domain resources which do not overlap, and frequency domain resources corresponding to RACH resources on different time domain resources are different within a preset time, and the preset time is used to receive a random access preamble.

Figure 8:
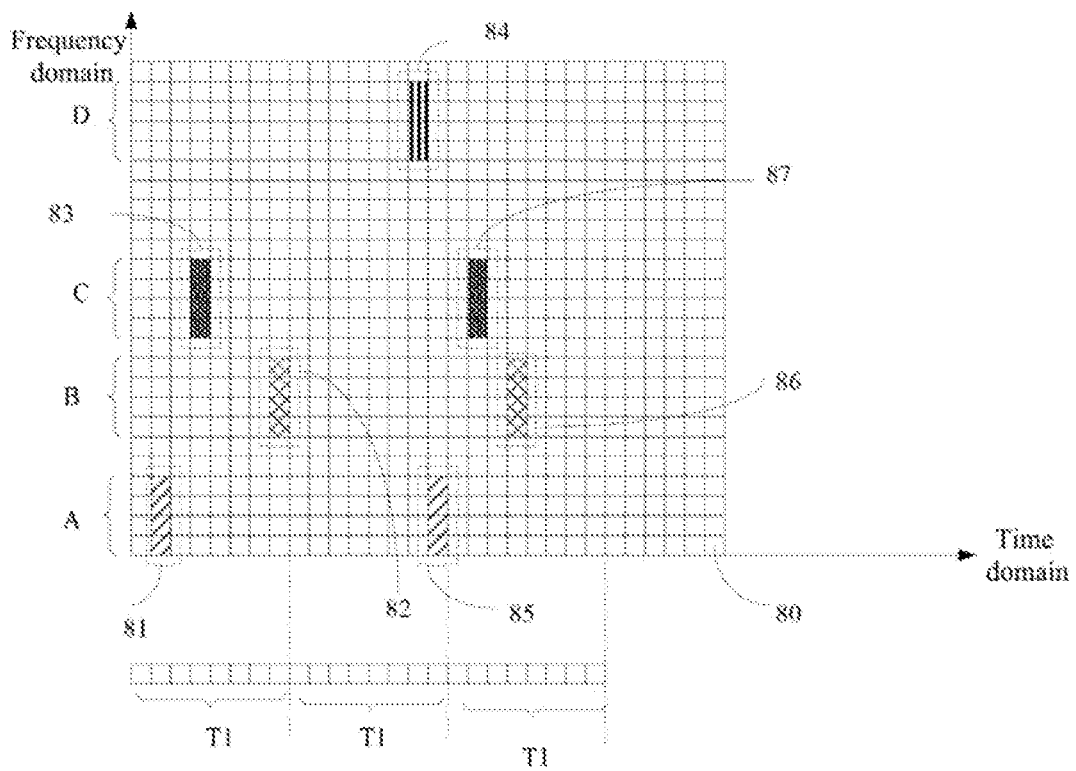
FIG. 8 is a schematic diagram of RACH resources provided by the present application.

As shown in FIG. 8, the horizontal axis represents the time domain, and the vertical axis represents the frequency domain, where time points or time periods in the time domain can be regarded as time domain resources, and frequency bands or frequency points in the frequency domain can be regarded as frequency domain resources. Specifically, here, a time unit in the time domain can be used as a time domain resource, and a unit of the frequency band width in the frequency domain can be used as a frequency domain resource. A time domain resource and a frequency domain resource can correspond to a resource unit, for example, a cell 80 shown in FIG. 8 represents a resource unit. The RACH resources configured by the network device to the terminal device can be a set of a plurality of resource units. For example, the RACH resources configured by the network device to the terminal device are a set of a resource 81, a resource 82, a resource 83, a resource 84, a resource 85, a resource 86 and a resource 87 shown in FIG. 8. Further, the network device sends configuration information of the RACH resources to the terminal device. Specifically, the configuration information can be used to configure time domain resources and frequency domain resources of the RACH resources. The time domain resources of the RACH resources are specifically the distribution of the RACH resources in the time domain. For example, the time domain resources of the RACH resources are time units corresponding to the resource 81, the resource 82, the resource 83, the resource 84, the resource 85, the resource 86 and the resource 87 respectively in the time domain. The frequency domain resources of the RACH resources are, for example, frequency ranges corresponding to the resource 81, the resource 82, the resource 83, the resource 84, the resource 85, the resource 86 and the resource 87 in the frequency domain. For example, the frequency range corresponding to the resource 81 and the resource 85 is denoted as A, the frequency range corresponding to the resource 82 and the resource 86 is denoted as B, the frequency range corresponding to the resource 83 and the resource 87 is denoted as C, and the frequency range corresponding to the resource 84 is denoted as D. Where the frequency range A, the frequency range B, the frequency range C and the frequency range D can be regarded as a group of frequency domain resources respectively. In other words, the RACH resources configured by the network device for the terminal device corresponds to multiple groups of frequency domain resources.

In addition, it should be noted that the multiple groups of frequency domain resources do not overlap, and the frequency domain resources corresponding to RACH resources on different time domain resources are different within the preset time for receiving the random access preamble.

For example, taking the frequency range A and the frequency range B as an example, if the frequency gradually increases along the longitudinal axis direction, the maximum frequency in the frequency range A may be the same as the minimum frequency in the frequency range B, or the maximum frequency in the frequency range A may be less than the minimum frequency in the frequency range B, but the maximum frequency in the frequency range A may not be greater than the minimum frequency in the frequency range B, because when the maximum frequency in the frequency range A is greater than the minimum frequency in the frequency range B, frequency range A and frequency range B would overlap.

In addition, as shown in FIG. 8, T1 represents the time length of receiving window for the random access preamble, which is a preset time. As shown in FIG. 8, take three T1 as an example, within each T1, the frequency domain resources corresponding to RACH resources on different time domain resources are different. For example, the time domain resources corresponding to the resource 81, the resource 82 and the resource 83 are in the first T1, and the frequency ranges corresponding to the resource 81, the resource 82 and the resource 83 respectively in the frequency domain are different. The time domain resources corresponding to the resource 84 and the resource 85 are in the second T1, and the frequency ranges corresponding to the resource 84 and the resource 85 respectively in the frequency domain are different. Similarly, the time domain resources corresponding to the resource 86 and the resource 87 are in the third T1, and the frequency ranges corresponding to the resource 86 and the resource 87 respectively in the frequency domain are different. In other words, in any time period with a time length of T1, the frequency domain resources corresponding to RACH resources on different time domain resources are different.

S702, the terminal device sends the random access preamble to the network device on the RACH resources, where the random access preamble is used to determine a timing advance of the terminal device.

After the terminal device receives the configuration information of the RACH resources, if the terminal device needs to perform random access, the terminal device can determine the RACH resources according to the configuration information, such as the resource 81—the resource 87 shown in FIG. 8. Further, the terminal device can select one resource from the resources 81-87 to send the random access preamble, for example, the terminal device selects the resource 81 to send the random access preamble, and further, the terminal device can allocate the resource 81 to a RACH, and send the random access preamble to the network device through the RACH.

In any receiving window for the random access preamble, the frequency domain resources corresponding to RACH resources on different time domain resources are different. Therefore, when the network device receives the random access preamble sent by the terminal device, a receiving time when the network device receives the random access preamble and a receiving window corresponding to the receiving time can be determined. Further, according to the frequency domain resources used by the network device to receive the random access preamble, the time-frequency resources corresponding to the frequency domain resources in the receiving window are determined, and the network device can determine a sending time of the random access preamble sent by the terminal device according to the time-frequency resources. Further, the network device can determine a TA of the terminal device according to the sending time and a receiving time of the random access preamble, and can determine an RA-RNTI according to the RACH resource corresponding to the random access preamble. The network device can send a random access response to the terminal device according to the RA-RNTI and the TA of the terminal device, where the random access response includes the TA of the terminal device.

Figure 9:
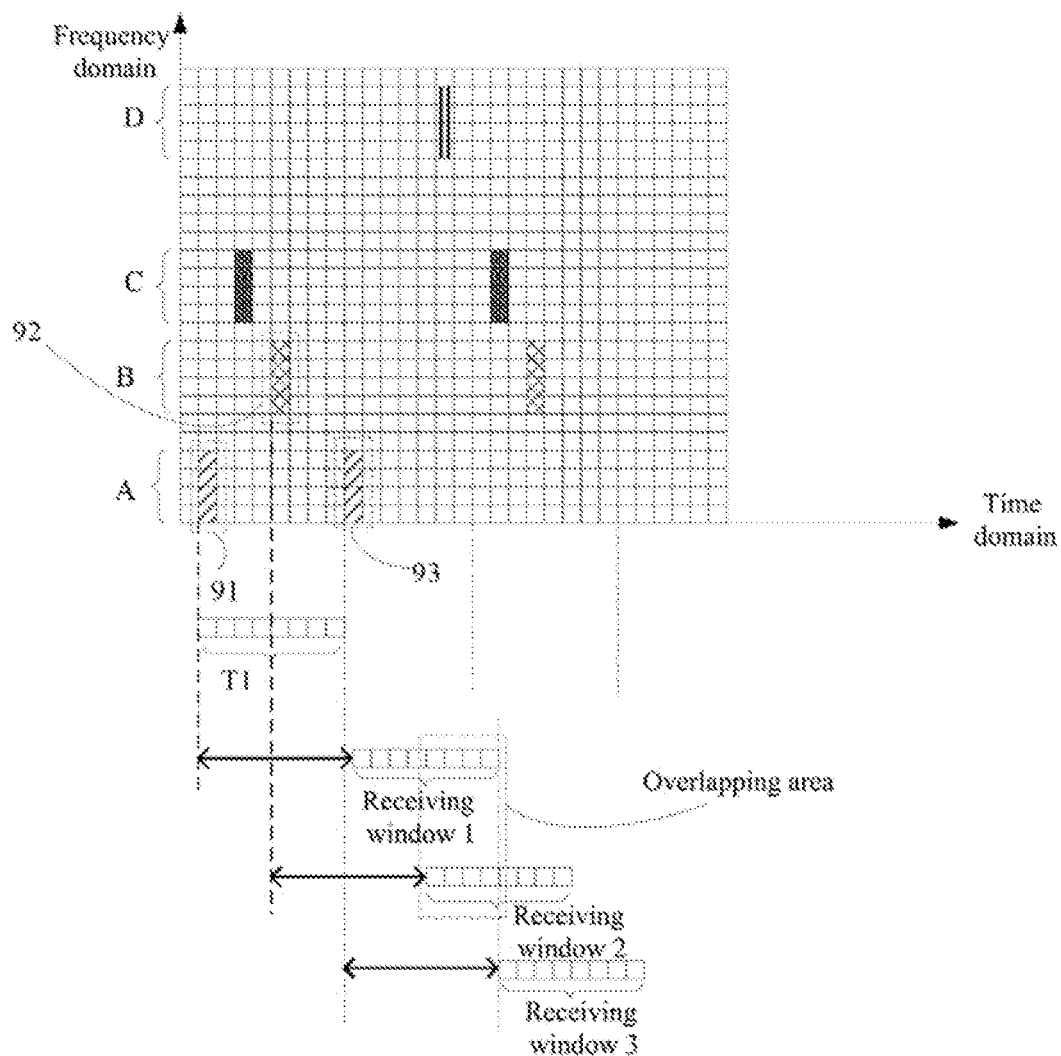
FIG. 9 is a schematic diagram of another RACH resources provided by the present application.

For example, as shown in FIG. 9, the RACH resources configured by the network device for the terminal device includes a resource 91, a resource 92 and a resource 93. For example, a coverage area of the network device includes a terminal device A, a terminal device B and a terminal device C, where the terminal device A adopts the resource 91 to send a random access preamble to the network device, the terminal device B adopts the resource 92 to send a random access preamble to the network device and the terminal device C adopts the resource 93 to send a random access preambles to the network device. Within T1, the resource 91 and the resource 92 respectively correspond to different time domain resources, and the resource 91 and the resource 92 respectively correspond to different frequency domain resources. Here, the resource 91 can be regarded as one RO and the resource 92 can be regarded as another RO. According to FIG. 5 or 6, each RO can correspond to a receiving window for a random access preamble. For example, the receiving window for the random access preamble corresponding to the resource 91 is the receiving window 1 as shown in FIG. 9, and the receiving window for the random access preamble corresponding to the resource 92 is the receiving window 2 as shown in FIG. 9. Since the time interval between the resource 91 and the resource 92 in the time domain is less than T1, i.e., the time length of the receiving window, there is an overlapping area between the receiving window 1 and the receiving window 2. It is assumed that the random access preamble sent by the terminal device A and the random access preamble sent by the terminal device B both reach the network device in this overlapping area. Since the terminal device A and the terminal device B respectively adopt different frequency domain resources to send random access preambles, frequency domain resources adopted by the network device to receive random access preambles sent by the terminal device A and the terminal device B respectively are different. Further, according to the frequency domain resource adopted by the network device to receive the random access preamble sent by the terminal device A, it is determined that the terminal device A uses the resource 91 for sending the random access preamble, and further, a sending time when the terminal device A sends the random access preamble is determined. In addition, according to the frequency domain resource adopted by the network device to receive the random access preamble sent by the terminal device B, it is determined that the terminal device B uses the resource 92 for sending the random access preamble sent by, and further, a sending time when the terminal device B sends the random access preamble is determined.

In addition, since the time interval between the resource 91 and the resource 93 is equal to T1, the receiving window 1 corresponding to the resource 91 and the receiving window 3 corresponding to the resource 93 just do not overlap. In other words, although the frequency domain resources corresponding to the resource 91 and the resource 93 are the same, since the time interval between the resource 91 and the resource 93 is equal to the time length of the receiving window for the random access preamble, the network device can normally determine sending times of the random access preambles received in the receiving window 1 and the receiving window 3.

According to a method for configuring random access channel resources provided by this embodiment, configuration information of RACH resources is sent to a terminal device by a network device, and multiple groups of frequency domain resources are configured for the RACH resources, and the multiple groups of frequency domain resources do not overlap, and in any receiving window for a random access preamble, frequency domain resources corresponding to RACH resources on different time domain resources are different, so as to make it possible to determine a time domain resource of the RACH resource according to a frequency domain resource corresponding to the RACH resource in a same receiving window, such that when the network device receives a random access preamble sent by the terminal device, the network device can determine, according to a frequency domain resource of a RACH resource corresponding to the random access preamble, a time domain resource of the RACH resource, and can determine a sending time of the random access preamble sent by the terminal device according to the time domain resource of the RACH resource, and further determine, according to a receiving time when the network device receives the random access preamble and the sending time when the terminal device sends the random access preamble, a TA of the terminal device, thus solving the problem of ambiguity in the receiving window for the random access preamble due to the increase of the time length of the receiving window for the random access preamble on the network device side in an NTN system.

On the basis of the above embodiments, the configuration information of the RACH resources sent by the network device to the terminal device may have many possible situations, which will be introduced with specific embodiments in the following.

In a possible situation, the configuration information is used to configure a group of time domain resources and multiple groups of frequency domain resources of the RACH resources. Where each group of frequency domain resources in the multiple groups of frequency domain resources includes a piece of continuous frequency domain resource segment, and the frequency domain resource segment includes at least one frequency domain resource. As shown in FIG. 8, the frequency range A can be regarded as a continuous frequency domain resource segment in the frequency domain, and the frequency domain resource segment includes one or more frequency domain resources. Here, a plurality of frequency domain resources are taken as an example. For example, the frequency range A includes four frequency domain resources.

Similarly, the frequency range B, the frequency range C and the frequency range D are a continuous frequency domain resource segment respectively. The frequency range B, the frequency range C and the frequency range D respectively include four frequency domain resources. In addition, the numbers of frequency domain resources included in the frequency range A, the frequency range B, the frequency range C and the frequency range D may be different. In other words, the lengths of a plurality of frequency domain resource segments may be the same or different. Where a plurality of frequency domain resources included in each frequency domain resource segment are continuous. Each frequency domain resource segment may or may not be continuous, but there is no overlap between each frequency domain resource segment. Frequency domain starting positions of the frequency domain resource segments are different, and in any receiving window for the random access preamble (for example, T1 shown in FIG. 12), RACH resources on different time domain resources correspond to different frequency domain resource segments.

Figure 10:
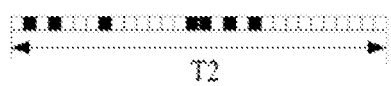
FIG. 10 is a schematic diagram of time domain resources corresponding to RACH resources provided by the present application.

Specifically, the time domain resources of the RACH resources include: a repetition period of the RACH resources and time domain positions of the RACH resources within the repetition period. As shown in FIG. 10, 12 represents the repetition period of the RACH resources, and the black boxes represent the RACH resources. The position of the black box in the time domain is recorded as a time domain position of the RACH resource. As shown in FIG. 10, there are seven time-domain positions corresponding to the RACH resources in one repetition period of the RACH resources. In other words, a group of time domain resources configured by the network device to the terminal device through the configuration information can be seven time domain positions corresponding to the RACH resources in a repetition period T2 as shown in FIG. 10.

Figure 11:
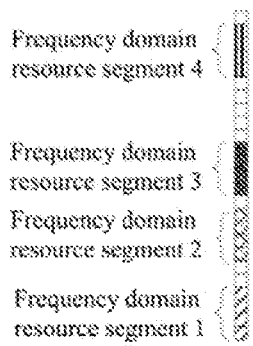
FIG. 11 is a schematic diagram of frequency domain resources corresponding to RACH resources provided by the present application.
Figure 12:
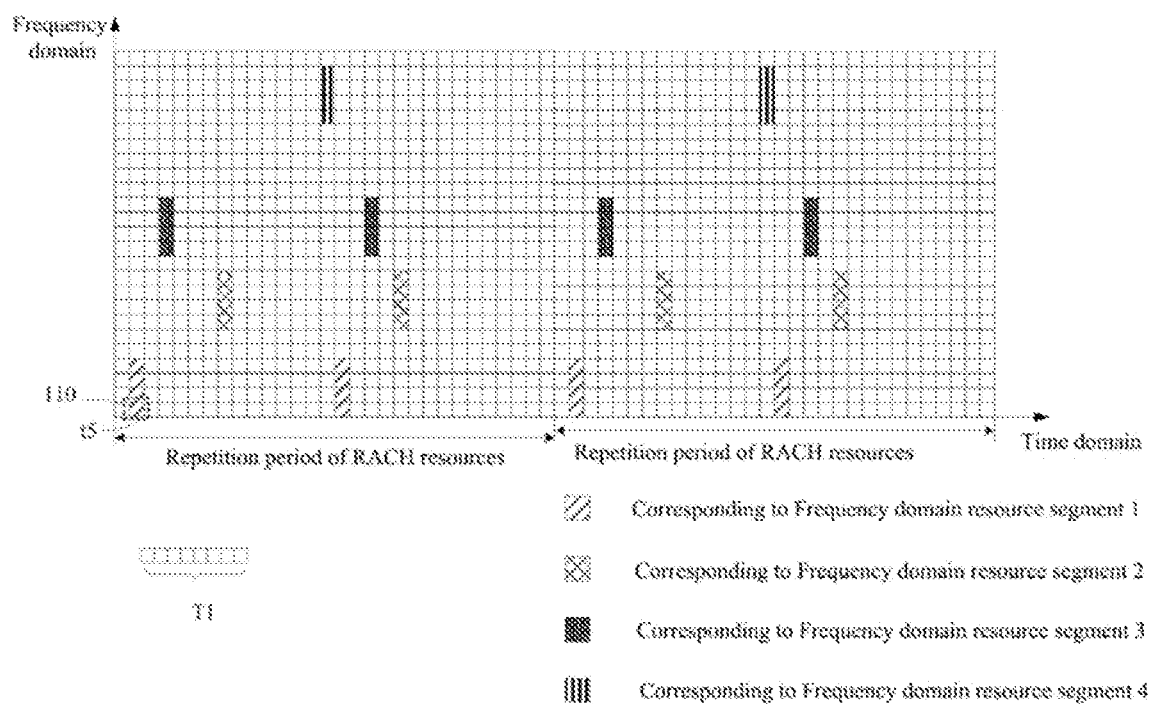
FIG. 12 is a schematic diagram of another RACH resources provided by the present application.

In addition, the configuration information also includes a corresponding relationship between time domain resources and frequency domain resources of the RACH resources. Specifically, a RACH resource at each of the time domain positions corresponds to a continuous frequency domain resource segment. FIG. 11 is a schematic diagram of frequency domain resource segments, where a continuous frequency domain resource segment 1 corresponds to the first RACH resource and the fifth RACH resource in a repetition period of the RACH resources; a continuous frequency domain resource segment 2 corresponds to the third RACH resource and the seventh RACH resource in one repetition period of the RACH resources; a continuous frequency domain resource segment 3 corresponds to the second RACH resource and the sixth RACH resource in one repetition period of the RACH resources; a continuous frequency domain resource segment 4 corresponds to the fourth RACH resource in one repetition period of the RACH resources. It can be understood that the corresponding relationship between frequency domain resource segments and RACH resources herein is only a schematic illustration, and is not specifically limited. According to this corresponding relationship, a schematic diagram of the RACH resources in two repetition periods of the RACH resources as shown in FIG. 12 can be obtained. Further, the terminal device can select a target resource from the RACH resources shown in FIG. 12, and send a random access preamble to the network device on the target resource. The target resource can specifically be one or more resource units.

As a possible mode, the terminal device can randomly select one or more resource units as a target resource from the RACH resources shown in FIG. 12. This mode can be applied to a competition-based random access procedure.

As another possible mode, the terminal device can determine a time domain resource of the target resource according to a time when the random access procedure is initiated, further, determine a frequency domain resource segment corresponding to the time domain resource of the target resource, and determine a frequency domain resource of the target resource from the frequency domain resource segment. For example, the time when the terminal device initiates the random access procedure is t5 as shown in FIG. 12, and the time domain resource of the target resource can be t5. Further, according to the corresponding relationship between time domain resources and frequency domain resources of the RACH resources, a continuous frequency domain resource segment 1 corresponding to t5 is determined, and a frequency domain resource is selected from the continuous frequency domain resource segment 1, and a resource unit 110 can be determined from the frequency domain resource and t5, and the resource unit 110 can be used as the target resource. This mode can be applied to a competition-based random access procedure.

As yet another possible mode, as described above, after the terminal device determines the frequency domain resource segment 1 according to t5, one or more frequency domain resources in the frequency domain resource segment 1 are determined according to an instruction from the network device, and one or more resource units can be determined from the one or more frequency domain resources and t5, and the one or more resource units can be used as the target resource. This mode can be applied to a non-competition-based random access procedure.

When the network device receives a random access preamble, the network device determines the time domain resource of the target resource according to the frequency domain resource of the target resource corresponding to the random access preamble, and further determines a sending time when the terminal device sends the random access preamble according to the time domain resource of the target resource, and determines a TA of the terminal device according to the sending time and a receiving time when the network device receives the random access preamble. Further, the network device can inform the terminal device of the TA through a random access response.

In another possible situation, the terminal device can receive a plurality pieces of configuration information sent by the network device, where each configuration information of the plurality pieces of configuration information is used to configure a group of time domain resources and a group of frequency domain resources of the RACH resources; where frequency domain resources configured by different pieces of configuration information in the plurality pieces of configuration information are different, and time domain resources configured by different pieces of configuration information in the plurality pieces of configuration information are different. It can be understood that in this situation, a group of time domain resources and a group of frequency domain resources configured by each configuration information can constitute a group of corresponding relationship.

Specifically, the terminal device can receive N pieces of configuration information sent by the network device, where N is greater than 1. The value of N is related to at least one of the time length of the receiving window for the random access preamble and the distribution density of the RACH resources in the time domain. Specifically, N can be the maximum number of the RACH resources on different time domain resources within a time period of the receiving window.

Figure 13:
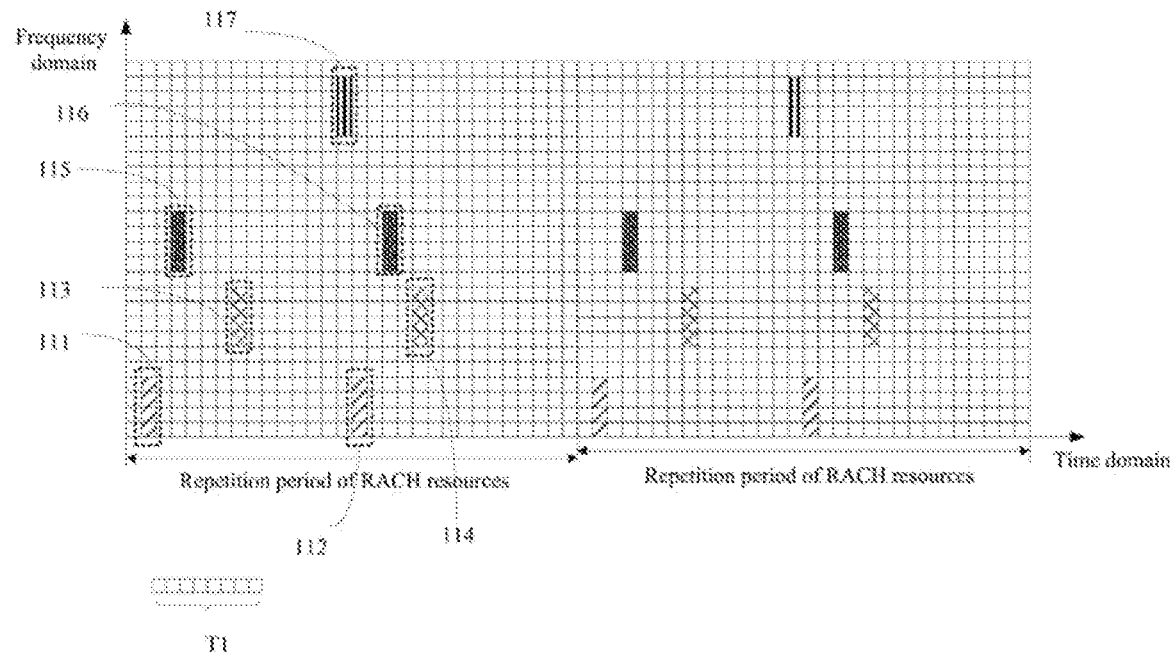
FIG. 13 is a schematic diagram of another RACH resources provided by the present application.

For example, the network device sends four pieces of configuration information to the terminal device, which are recorded as configuration information 1, configuration information 2, configuration information 3 and configuration information 4 in sequence. As shown in FIG. 13, a group of time domain resources and a group of frequency domain resources corresponding to a resource 111 and a resource 112 are configured by the configuration information 1, a group of time domain resources and a group of frequency domain resources corresponding to a resource 113 and a resource 114 are configured by the configuration information 2, a group of time domain resources and a group of frequency domain resources corresponding to a resource 115 and a resource 116 are configured by the configuration information 3, and a group of time domain resources and a group of frequency domain resources corresponding to a resource 117 are configured by the configuration information 4. Where the frequency domain resources configured by the configuration information 1, the configuration information 2, the configuration information 3 and the configuration information 4 are different. The frequency domain resources respectively configured by the configuration information 1, the configuration information 2, the configuration information 3 and the configuration information 4 do not overlap, and in any receiving window for the random access preamble (for example, T1 shown in FIG. 13), RACH resources on different time domain resources correspond to different frequency domain resources. Where the time domain resources configured by the configuration information 1, the configuration information 2, the configuration information 3 and the configuration information 4 are also different. Where the frequency domain resources respectively configured by the configuration information 1, the configuration information 2, the configuration information 3 and the configuration information 4 can be a continuous frequency domain resource segment. The frequency domain resource segment herein is consistent with the frequency domain resource segment described above, which will not be repeated herein.

When the terminal device needs to perform random access, the terminal device can determine the RACH resources according to the configuration information, and determine a target resource from the RACH resources. The method for determining the target resource is specifically as described above, and will not be repeated herein. Further, the random access preamble is sent to the network device through the target resource. The network device receives the random access preamble, and the process for determining a TA of the terminal device is also as described above, which will not be repeated herein.

In yet another possible situation, the configuration information sent by the network device is used to configure a group of time domain resources and a group of frequency domain resources of the RACH resources; the configuration information also includes a frequency hopping rule based on the group of frequency domain resources, where the frequency hopping rule is used to determine the multiple groups of frequency domain resources corresponding to the RACH resources. Where the frequency hopping rule includes a frequency hopping interval and a number of times of frequency hopping.

Figure 14:
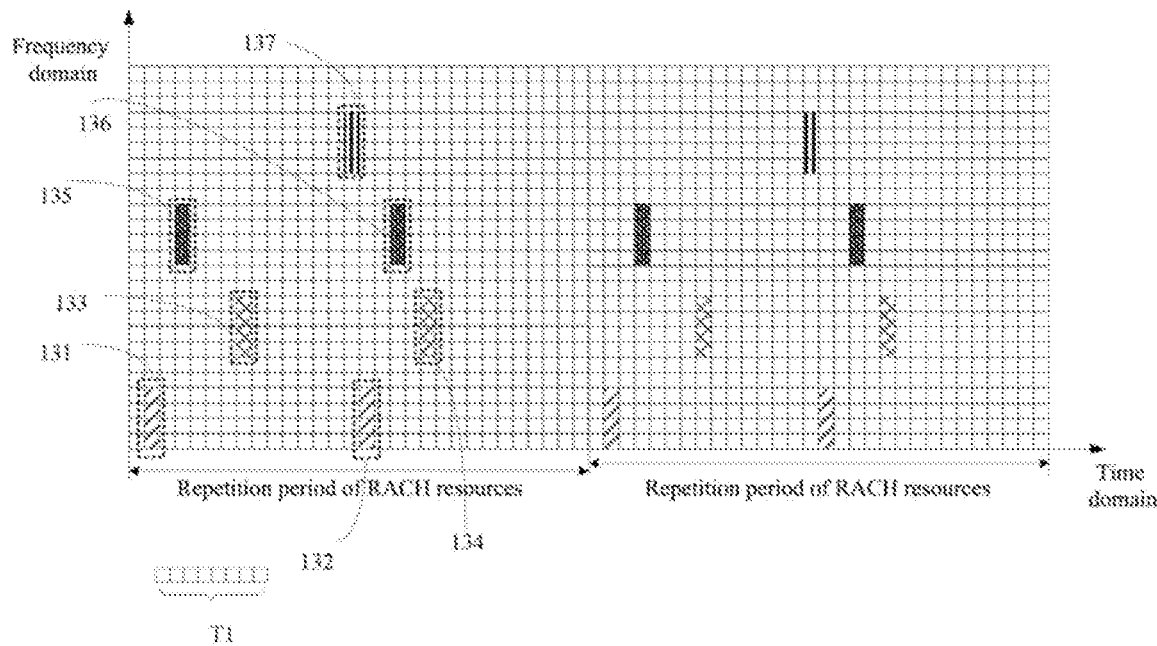
FIG. 14 is a schematic diagram of yet another RACH resources provided by the present application.

As shown in FIG. 14, a group of time domain resources and a group of frequency domain resources corresponding to a resource 131 and a resource 132 are configured by configuration information sent by the network device. Where this group of time domain resources is respective time domain positions corresponding to the resource 131 and the resource 132 in the time domain. This group of frequency domain resources is respective frequency domain resources corresponding to the resource 131 and the resource 132 in the frequency domain. In addition, the group of frequency domain resources corresponding to the resource 131 and the resource 132 is a continuous frequency domain resource segment. A group of frequency domain resources corresponding to the resource 131 and the resource 132 can be recorded as a frequency domain resource segment 0.

In addition, the configuration information may also include a frequency hopping rule based on the frequency domain resource segment 0. The frequency hopping rule includes a frequency hopping interval and a number of times of frequency hopping. For example, the frequency hopping interval is 2 and the number of times of frequency hopping is 3. According to the frequency hopping interval and the number of times of frequency hopping, multiple groups of frequency domain resources can be determined. For example, a group of frequency domain resources corresponding to a resource 133 and a resource 134 is a continuous frequency domain resource segment determined after frequency hopping is performed once at the frequency hopping interval 2 on the basis of the frequency domain resource segment 0. A group of frequency domain resources corresponding to the resource 133 and the resource 134 can be recorded as a frequency domain resource segment 1. Similarly, a group of frequency domain resources corresponding to a resource 135 and a resource 136 can be recorded as a frequency domain resource segment 2, which is determined after frequency hopping is performed twice according to the frequency hopping interval 2 based on the frequency domain resource segment 0. A group of frequency domain resources corresponding to a resource 137 can be recorded as a frequency domain resource segment 3, which is determined after frequency hopping is performed three times according to the frequency hopping interval 2 based on the frequency domain resource segment 0. The frequency domain resource segment 0, the frequency domain resource segment 1, the frequency domain resource segment 2 and the frequency domain resource segment 3 are multiple groups of frequency domain resources corresponding to the RACH resources configured by the network device for the terminal device. The frequency domain resource segments do not overlap with each other, and in any receiving window for the random access preamble (such as T1 shown in FIG. 14), RACH resources on different time domain resources correspond to different frequency domain resource segments.

In addition, the configuration information may also include a corresponding relationship between time domain resources and frequency domain resources of the RACH resources. For the corresponding relationship, reference can be made to the corresponding relationship described in the embodiment of FIG. 12. For example, the frequency domain resource segment 1 corresponding to the resource 133 and the resource 134 corresponds to the third RACH resource and the seventh RACH resource in one repetition period of the RACH resources; the frequency domain resource segment 2 corresponding to the resource 135 and the resource 136 corresponds to the second RACH resource and the sixth RACH resource in one repetition period of the RACH resources; the frequency domain resource segment 3 corresponding to the resource 137 corresponds to the fourth RACH resource in one repetition period of the RACH resources.

In addition, as shown in FIG. 14, the frequency hopping interval is a fixed value, and the interval between every two adjacent segments in the frequency domain resource segment 0, the frequency domain resource segment 1, the frequency domain resource segment 2 and the frequency domain resource segment 3 is two resource units.

It can be understood that the frequency hopping interval can also be a variable value, that is, the intervals between every two adjacent segments in the frequency domain resource segment 0, the frequency domain resource segment 1, the frequency domain resource segment 2 and the frequency domain resource segment 3 are different.

In addition, the configuration information may also include the length of each frequency domain resource segment, for example, the number of frequency domain resources included in each of the frequency domain resource segment 0, the frequency domain resource segment 1, the frequency domain resource segment 2 and the frequency domain resource segment 3. Where the numbers of frequency domain resources included in different frequency domain resource segments can be the same or different.

On the basis of the above embodiments, the configuration information sent by the network device to the terminal device can be the configuration information common to the coverage area of the satellite. Specifically, the configuration information can be carried in a system message, for example, the configuration information can be carried in a system information block (SIB) x, where x is greater than or equal to 1.

In addition, the number of frequency domain resource segments mentioned above is related to at least one of the time length of the receiving window for the random access preamble and the distribution density of the RACH resources in the time domain. Specifically, the number of frequency domain resource segments can be the maximum number of the RACH resources on different time domain resources within a time period with the length of the receiving window.

In the method for configuring random access channel resources provided by this embodiment, multiple groups of frequency domain resources can be configured for the RACH resources through the configuration information of the RACH resources sent by the network device to the terminal device in several possible ways as described above, thus improving the flexibility of configuring the RACH resources with the configuration information.

Figure 15:
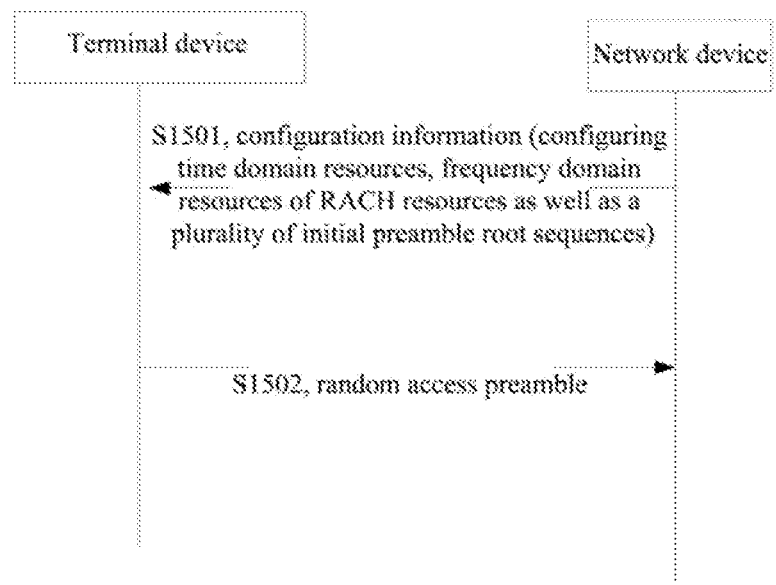
FIG. 15 is a flow chart of another method for configuring random access channel resources provided by the present application.

FIG. 15 is a flow chart of another method for configuring random access channel resources provided by the present application. As shown in FIG. 15, the method for configuring random access channel resources includes the following steps:

S1501, a terminal device receives configuration information sent by a network device.

Specifically, before the terminal device sends the random access preamble to the network device, the network device sends configuration information to the terminal device, and the terminal device receives the configuration information. Where the configuration information is used to configure time domain resources and frequency domain resources of the random access channel RACH resources. In addition, the configuration information is further used to configure a plurality of initial preamble root sequences. RACH resources on different time domain resources correspond to different initial preamble root sequences within a preset time, where the preset time is used to receive a random access preamble.

Figure 16:
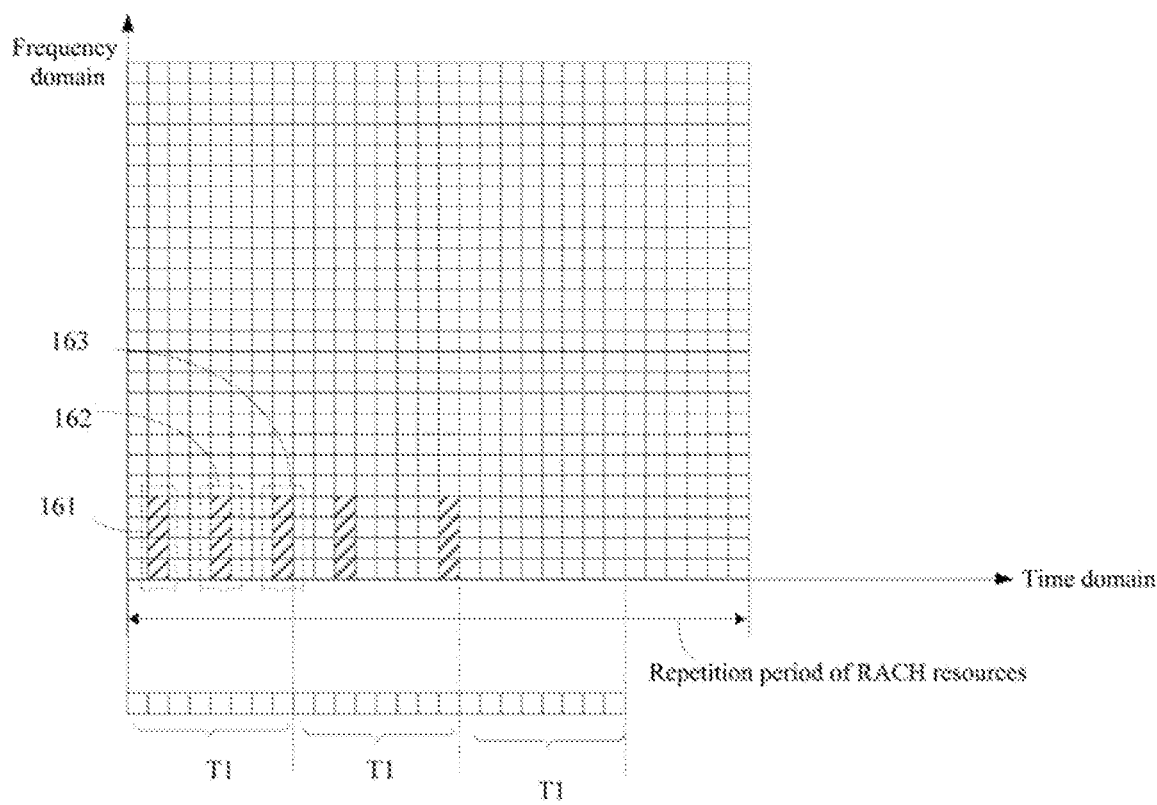
FIG. 16 is a schematic diagram of yet another RACH resources provided by the present application.

The time domain resources configured by the network device for the terminal device can be the distribution of the RACH resources in the time domain, thus the time domain positions of the RACH resources in the time domain can be determined. As shown in FIG. 16, a resource 161, a resource 162 and a resource 163 are RACH resources configured by the network device for the terminal device. The configuration information sent by the network device to the terminal device can be used to configure a group of time domain resources and a group of frequency domain resources. This group of time domain resources can be the repetition period of the RACH resources as shown in FIG. 16, and the time domain positions where the RACH resources appear on the repetition period. As shown in FIG. 16, the resource 161, the resource 162 and the resource 163 correspond to a group of frequency domain resources, which can be a continuous frequency domain resource segment, and the frequency domain resource segment is consistent with the frequency domain resource segment described above.

In addition, the configuration information is also used to configure a plurality of initial preamble root sequences, and RACH resources on different domain resources correspond to different initial preamble root sequences within any time period with a time length of T1. For example, the resource 161, the resource 162 and the resource 163 respectively correspond to different initial preamble root sequences. For example, the initial preamble root sequence corresponding to the resource 161 is recorded as an initial preamble root sequence 1, the initial preamble root sequence corresponding to the resource 162 is recorded as an initial preamble root sequence 2 and the initial preamble root sequence corresponding to the resource 163 is recorded as an initial preamble root sequence 3.

S1502, the terminal device sends a random access preamble to the network device on the RACH resources, where the random access preamble is used to determine a timing advance of the terminal device.

Specifically, the terminal device can select a resource whose time domain position matches with a time when the random access procedure is initiated as a target resource from the resource 161, the resource 162 and the resource 163 according to the time. For example, if the time domain position of the resource 161 matches with the time when the terminal device initiates the random access procedure, then the resource 161 can be used as the target resource. Further, the terminal device can generate a preamble sequence set corresponding to the initial preamble root sequence 1 according to the initial preamble root sequence 1 corresponding to the resource 161 through cyclic shift, and the preamble sequence set can include a plurality of preamble sequences. The terminal device can randomly select a preamble sequence from the preamble sequence set as a to-be-sent random access preamble, which is suitable for the competition-based random access mode. Alternatively, terminal device can determine a preamble sequence indicated by the network device from the preamble sequence set according to indication information from the network device as a to-be-sent random access preamble, which is suitable for the non-competition-based random access mode. Further, the terminal device can use the resource 161 to send the random access preamble to the network device.

When receiving the random access preamble, the network device can determine the preamble sequence set to which the random access preamble belongs, and determine the initial preamble root sequence corresponding to the preamble sequence set. Further, the network device determines, according to the initial preamble root sequence, the time domain resource of the RACH resource corresponding to the random access preamble, i.e., the time domain position of the resource 161. The network device can determine, according to the time domain position of the resource 161, a sending time when the terminal device sends the random access preamble, and further determine a TA of the terminal device according to the sending time and a receiving time when the network device receives the random access preamble. In addition, the network device can also determine an RA-RNTI according to the RACH resource corresponding to the random access preamble. The network device can send a random access response to the terminal device according to the RA-RNTI and the TA of the terminal device, and the random access response includes the TA of the terminal device.

According to a method for configuring random access channel resources provided by this embodiment, configuration information of RACH resources is sent to a terminal device by a network device, and time domain resources and frequency domain resources of the RACH resources are configured for the RACH resources. In addition, a plurality of initial preamble root sequences may further be configured through the configuration information, and in any receiving window for the random access preamble, initial preamble root sequences corresponding to the RACH resources on different time domain resources are different, so as to make it possible to determine a time domain resource of a RACH resource according to an initial preamble root sequence corresponding to the RACH resource in a same receiving window, such that when the network device receives the random access preamble sent by the terminal device, the network device can determine, according to the initial preamble root sequence corresponding to a RACH resource corresponding to the random access preamble, a time domain resource of the RACH resource, and can determine a sending time of the random access preamble sent by the terminal device according to the time domain resource of the RACH resource, and further determine, according to a receiving time when the network device receives the random access preamble and the sending time when the terminal device sends the random access preamble, a TA of the terminal device.

On the basis of the above embodiments, the initial preamble root sequence corresponding to the resource 161 is recorded as the initial preamble root sequence 1, the initial preamble root sequence corresponding to the resource 162 is recorded as the initial preamble root sequence 2 and the initial preamble root sequence corresponding to the resource 163 is recorded as the initial preamble root sequence 3. In this embodiment, the preamble sequence set generated through cyclic shift according to the initial preamble root sequence 1 corresponding to the resource 161 can be recorded as a set A; the preamble sequence set generated through cyclic shift from the initial preamble root sequence 2 corresponding to the resource 162 is recorded as a set B; the preamble sequence set generated through cyclic shift from the initial preamble root sequence 3 corresponding to the resource 163 is recorded as a set C, where the set A, the set B and the set C have no intersection with each other.

In addition, the number of initial preamble root sequences configured by the network device for the terminal device is related to at least one of the time length of the receiving window for the random access preamble and the distribution density of the RACH resources in the time domain. Specifically, the number of initial preamble root sequences can be the maximum number of the RACH resources on different time domain resources within a time period with the length of the receiving window.

In addition, the configuration information may also include a corresponding relationship between the time domain resources and the initial preamble root sequences of the RACH resources. Specifically, a RACH resource at each of the time domain positions corresponds to an initial preamble root sequence. As shown in FIG. 16, within a repetition period of the RACH resources, the RACH resources at different time domain positions correspond to respective initial preamble root sequences, and within any time period with a time length of T1, the RACH resources at different time domain resources correspond to different initial preamble root sequences.

It can be understood that in the embodiments of the present application, the configuration information sent by the network device to the terminal device can be the configuration information common to the coverage area of the satellite. Specifically, the configuration information can be carried in a system message, for example, the configuration information can be carried in a system information block (SIB) x, where x is greater than or equal to 1.

In addition, it should be noted that in the embodiments of the present application, capital letters and lowercase letters respectively represent different meanings. For example, capital "T1" represents a time length of a receiving window for a random access preamble, and lowercase "t1" represents a time when the terminal device nearest to the network device receives configuration information of an RO.

Figure 17:
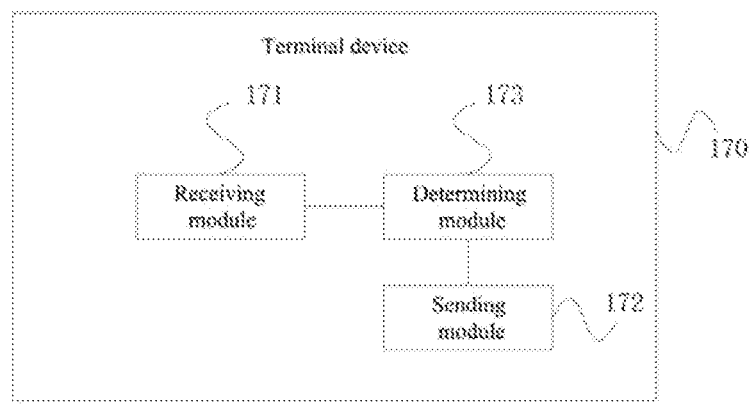
FIG. 17 is a structural schematic diagram of a terminal device provided by the present application.

FIG. 17 is a structural schematic diagram of a terminal device provided by the present application; as shown in FIG. 17, the terminal device 170 includes: a receiving module 171, and a sending module 172; where the receiving module 171 is configured to receive configuration information sent by a network device, where the configuration information is used to configure time domain resources and frequency domain resources of the random access channel RACH resources, the RACH resources correspond to multiple groups of frequency domain resources, the multiple groups of frequency domain resources do not overlap, and frequency domain resources corresponding to RACH resources on different time domain resources are different within a preset time, where the preset time is used to receive a random access preamble; the sending module 172 is configured to send the random access preamble to the network device on the RACH resources.

The terminal device provided in this embodiment is used to execute the technical solution of the terminal device side in any of the above-mentioned method embodiments, and its implementation principle and technical effect are similar, which will not be repeated herein.

On the basis of the above embodiment shown in FIG. 17, the configuration information is used to configure a group of time domain resources and multiple groups of frequency domain resources of the RACH resources.

In an embodiment, when receiving configuration information sent by a network device, the receiving module 171 is specifically configured to: receive a plurality pieces of configuration information sent by the network device, where each configuration information of the plurality pieces of configuration information is used to configure a group of time domain resources and a group of frequency domain resources of the RACH resources; where frequency domain resources configured by different pieces of configuration information in the plurality pieces of configuration information are different, and time domain resources configured by the different pieces of configuration information in the plurality pieces of configuration information are different.

In an embodiment, the configuration information is used to configure a group of time domain resources and a group of frequency domain resources of the RACH resources; the configuration information further includes a frequency hopping rule based on the group of frequency domain resources, where the frequency hopping rule is used to determine the multiple groups of frequency domain resources corresponding to the RACH resources.

In an embodiment, the frequency hopping rule includes a frequency hopping interval and a number of times of frequency hopping.

In an embodiment, each group of frequency domain resources in the multiple groups of frequency domain resources includes a piece of continuous frequency domain resource segment, where the frequency domain resource segment includes at least one frequency domain resource.

In an embodiment, the time domain resources of the RACH resources include: a repetition period of the RACH resources and time domain positions of the RACH resources within the repetition period.

In an embodiment, the configuration information further includes: a corresponding relationship between the time domain resources and the frequency domain resources of the RACH resources; where a RACH resource at each of the time domain positions corresponds to a piece of continuous frequency domain resource segment.

In an embodiment, multiple frequency domain resource segments have a same length.

In an embodiment, multiple frequency domain resource segments have different lengths.

In an embodiment, a number of frequency domain resource segments is related to at least one of the preset time and a distribution density of the RACH resources in a time domain.

In an embodiment, a number of frequency domain resource segments is a maximum number of the RACH resources on different time domain resources within the preset time.

In an embodiment, the terminal device further includes: a determining module 173 configured to determine a target resource from the RACH resources; when sending the random access preamble to the network device on the RACH resources, the sending module 172 is specifically configured to: send the random access preamble to the network device on the target resource.

In an embodiment, when determining the target resource from the RACH resources, the determining module 173 is specifically configured to: determine a time domain resource of the target resource according to a time when the terminal device initiates a random access procedure; determine a frequency domain resource segment corresponding to the time domain resource of the target resource; and determine a frequency domain resource of the target resource from the frequency domain resource segment.

Figure 18:
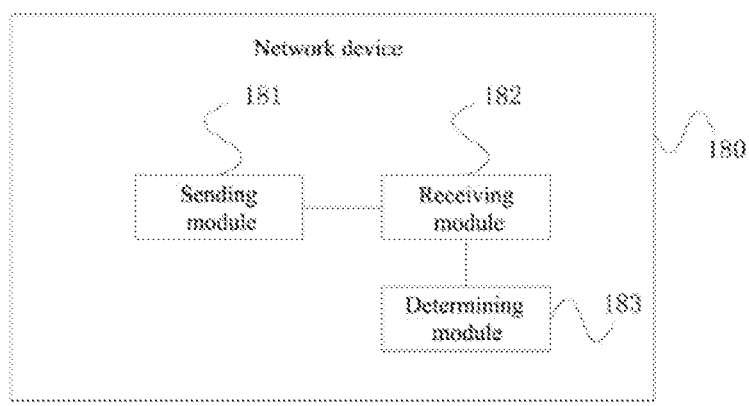
FIG. 18 is a structural schematic diagram of a network device provided by the present application.

FIG. 18 is a structural schematic diagram of a network device provided by the present application; as shown in FIG. 18, the network device 180 includes: a sending module 181 and a receiving module 182; where the sending module 181 is configured to send configuration information to the terminal device, where the configuration information is used to configure time domain resources and frequency domain resources of the random access channel RACH resources, the RACH resources correspond to multiple groups of frequency domain resources, the multiple groups of frequency domain resources do not overlap, and frequency domain resources corresponding to RACH resources on different time domain resources are different within a preset time, where the preset time is used to receive a random access preamble; the receiving module 182 is configured to receive the random access preamble sent by the terminal device.

The network device provided in this embodiment is used to execute the technical solution of the network device side in any of the above-mentioned method embodiments, and its implementation principle and technical effect are similar, which will not be repeated herein.

Further, the network device further includes: a determining module 183, configured to determine, according to a frequency domain resource of a RACH resource corresponding to the random access preamble, a time domain resource of the RACH resource after the receiving module 182 receives the random access preamble sent by the terminal device; determine a time when the terminal device sends the random access preamble according to the time domain resource of the RACH resource; and determine a timing advance of the terminal device according to the time when the terminal device sends the random access preamble and a time when the network device receives the random access preamble.

In an embodiment, the configuration information is used to configure a group of time domain resources and multiple groups of frequency domain resources of the RACH resources.

In an embodiment, when sending configuration information to the terminal device, the receiving module 181 is specifically configured to: send a plurality pieces of configuration information to the terminal device, where each configuration information of the plurality pieces of configuration information is used to configure a group of time domain resources and a group of frequency domain resources of the RACH resources; where frequency domain resources configured by different pieces of configuration information in the plurality pieces of configuration information are different, and time domain resources configured by the different pieces of configuration information in the plurality pieces of configuration information are different.

In an embodiment, the configuration information is used to configure a group of time domain resources and a group of frequency domain resources of the RACH resources; the configuration information further includes a frequency hopping rule based on the group of frequency domain resources, where the frequency hopping rule is used to determine the multiple groups of frequency domain resources corresponding to the RACH resources.

In an embodiment, the frequency hopping rule includes a frequency hopping interval and a number of times of frequency hopping.

In an embodiment, each group of frequency domain resources in the multiple groups of frequency domain resources includes a piece of continuous frequency domain resource segment, where the frequency domain resource segment includes at least one frequency domain resource.

In an embodiment, the time domain resources of the RACH resources include: a repetition period of the RACH resources and time domain positions of the RACH resources within the repetition period.

In an embodiment, the configuration information further includes: a corresponding relationship between the time domain resources and the frequency domain resources of the RACH resources; where a RACH resource at each of the time domain positions corresponds to a piece of continuous frequency domain resource segment.

In an embodiment, multiple frequency domain resource segments have a same length.

In an embodiment, multiple frequency domain resource segments have different lengths.

In an embodiment, a number of frequency domain resource segments is related to at least one of the preset time and a distribution density of the RACH resources in a time domain.

In an embodiment, a number of frequency domain resource segments is the maximum number of the RACH resources on different time domain resources within the preset time.

Figure 19:
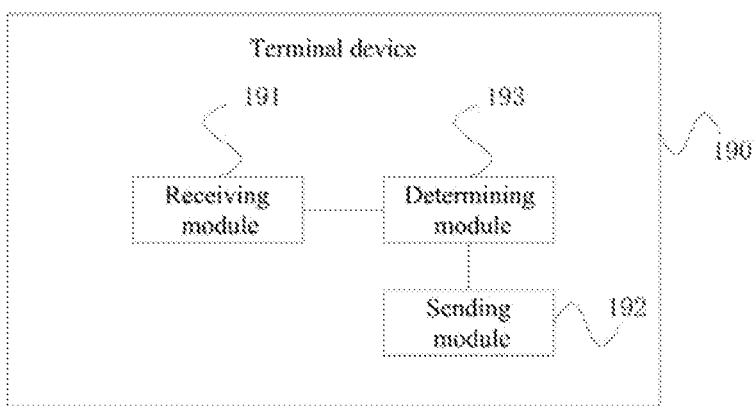
FIG. 19 is a structural schematic diagram of a terminal device provided by the present application.

FIG. 19 is a structural schematic diagram of a terminal device provided by the present application; as shown in FIG. 19, the terminal device 190 includes: a receiving module 191, and a sending module 192; where the receiving module 191 is configured to receive configuration information sent by a network device, where the configuration information is used to configure time domain resources and frequency domain resources of the random access channel RACH resources, the configuration information is further used to configure a plurality of initial preamble root sequences, RACH resources on different time domain resources correspond to different initial preamble root sequences within a preset time, where the preset time is used to receive a random access preamble; the sending module 192 is configured to send the random access preamble to the network device on the RACH resources.

The terminal device provided in this embodiment is used to execute the technical solution of the terminal device side in any of the above-mentioned method embodiments, and its implementation principle and technical effect are similar, which will not be repeated herein.

On the basis of the above embodiment shown in FIG. 19, each initial preamble root sequence in the plurality of initial preamble root sequences corresponds to a preamble sequence set, preamble sequence sets corresponding to the plurality of initial preamble root sequences do not intersect with each other.

In an embodiment, a number of the initial preamble root sequences is related to at least one of the preset time and a distribution density of the RACH resources in a time domain.

In an embodiment, a number of the initial preamble root sequences is a maximum number of the RACH resources on different time domain resources within the preset time.

In an embodiment, the time domain resources of the RACH resources include: a repetition period of the RACH resources and time domain positions of the RACH resources within the repetition period.

In an embodiment, the configuration information further includes a corresponding relationship between the time domain resources and the initial preamble root sequences of the RACH resources; where a RACH resource at each of the time domain positions corresponds to an initial preamble root sequence.

In an embodiment, the terminal device further includes: a determining module 193, configured to: determine a time domain position of a target resource for sending the random access preamble in the RACH resources according to a time when the terminal device initiates a random access procedure before the sending module 192 sends the random access preamble to the network device on the RACH resources; determine a preamble sequence set corresponding to the initial preamble root sequence according to the initial preamble root sequence corresponding to the time domain position of the target resource; and determine the random access preamble from the preamble sequence set.

Figure 20:
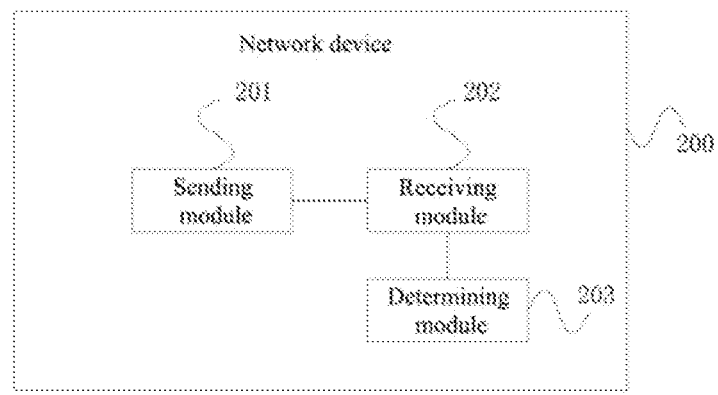
FIG. 20 is a structural schematic diagram of a network device provided by the present application.

FIG. 20 is a structural schematic diagram of a network device provided by the present application; as shown in FIG. 20, the network device 200 includes: a sending module 201 and a receiving module 202; where the sending module 201 is configured to send configuration information to the terminal device, where the configuration information is used to configure time domain resources and frequency domain resources of the random access channel RACH resources, the configuration information is further used to configure a plurality of initial preamble root sequences, RACH resources on different time domain resources correspond to different initial preamble root sequences within a preset time, where the preset time is used to receive a random access preamble; a receiving module 202 is configured to receive the random access preamble sent by the terminal device.

The network device provided in this embodiment is used to execute the technical solution of the network device side in any of the above-mentioned method embodiments, and its implementation principle and technical effect are similar, which will not be repeated herein.

In an embodiment, the network device further includes: a determining module 203, configured to: determine an initial preamble root sequence corresponding to a preamble sequence set according to the preamble sequence set to which the random access preamble belongs after the receiving module 202 receives the random access preamble sent by the terminal device; determine a time domain resource of a RACH resource corresponding to the initial preamble root sequence; determine a time when the terminal device sends the random access preamble according to the time domain resource of the RACH resource; and determine a timing advance of the terminal device according to the time when the terminal device sends the random access preamble and a time when the network device receives the random access preamble.

In an embodiment, each initial preamble root sequence in the plurality of initial preamble root sequences corresponds to a preamble sequence set, where preamble sequence sets corresponding to the plurality of initial preamble root sequences do not intersect with each other.

In an embodiment, a number of the initial preamble root sequences is related to at least one of the preset time and a distribution density of the RACH resources in time domain.

In an embodiment, a number of the initial preamble root sequences is a maximum number of the RACH resources on different time domain resources within the preset time.

In an embodiment, the time domain resources of the RACH resources include: a repetition period of the RACH resources and time domain positions of the RACH resources within the repetition period.

In an embodiment, the configuration information further includes a corresponding relationship between the time domain resources and the initial preamble root sequences of the RACH resources; where a RACH resource at each of the time domain positions corresponds to an initial preamble root sequence.

Figure 21:
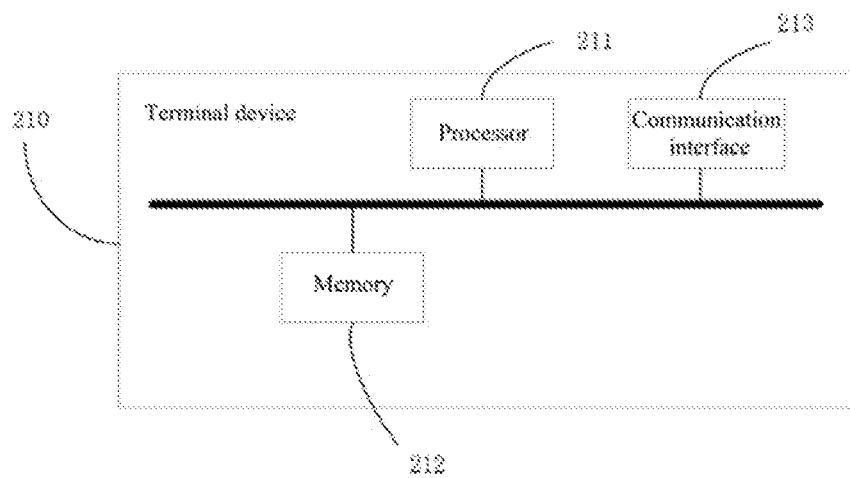
FIG. 21 is another structural schematic diagram of a terminal device provided by the present application.

FIG. 21 is another structural schematic diagram of a terminal device provided by the present application; as shown in FIG. 21, the terminal device 210 includes:

a processor 211, a memory 212, and a communication interface 213;

the memory 212 stores computer-executable instructions;

the processor 211 executes the computer-executable instructions stored in the memory 212, causing the processor 211 to execute the technical solution of the terminal device side in any of the aforementioned method embodiments.

FIG. 21 is a simple design of a terminal device; the embodiments of the present application do not limit the number of processors and memories in the terminal device, and an example is taken where the number of processors and memories in FIG. 21 is one.

Figure 22:
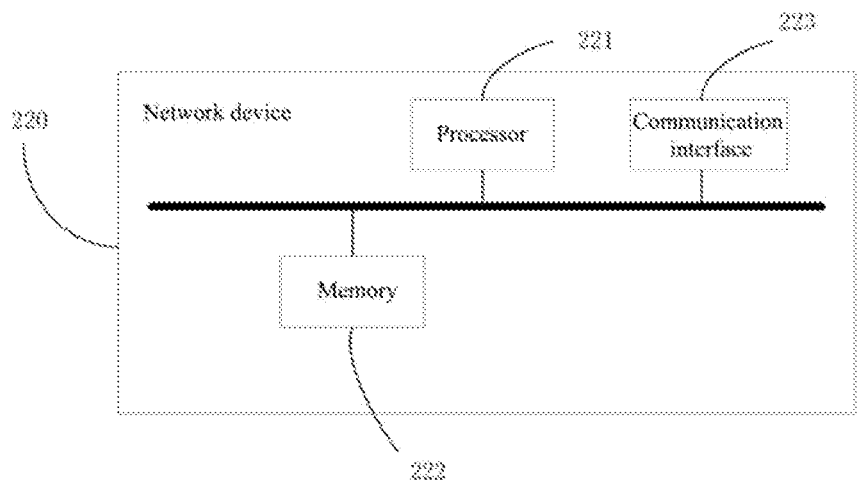
FIG. 22 is another structural schematic diagram of a network device provided by the present application.

FIG. 22 is another structural schematic diagram of a network device provided by the present application, as shown in FIG. 22, the network device 220 includes:

a processor 221, a memory 222, and a communication interface 223;

the memory 222 stores computer-executable instructions;

the processor 221 executes the computer-executable instructions stored in the memory 222, causing the processor 221 to execute the technical solution of the network device side in any of the aforementioned method embodiments.

FIG. 22 is a simple design of a network device; the embodiments of the present application do not limit the number of processors and memories in the network device, and an example is taken where the number of processors and memories in FIG. 22 is one.

In a specific implementation of the terminal device shown in FIG. 21 and the network device shown in FIG. 22, the memory, the processor and the communication interface can be connected by a bus, and in an embodiment, the memory can be integrated inside the processor.

An embodiment of the present application further provides a computer readable storage medium storing computer-executable instructions, when the computer-executable instructions are executed by a processor, the method for configuring random access channel resources described in any of the aforementioned method embodiments is implemented.

An embodiment of the present application further provides a chip including a processor for calling and running a computer program from a memory, so as to enable a device on which the chip is installed to execute the method for configuring random access channel resources described in any of the aforementioned method embodiments.

An embodiment of the present application further provides a computer program product including computer program instructions that cause a computer to execute the method for configuring random access channel resources described in any of the aforementioned method embodiments.

An embodiment of the present application further provides a computer program that causes a computer to execute the method for configuring random access channel resources described in any of the aforementioned method embodiments.

In the several embodiments provided by the present application, it should be understood that the disclosed devices and methods may be implemented in other manners. For example, the device embodiments described above are only illustrative. For example, the division of the module is only a logical function division, and there may be other divisions in actual implementation, for example, multiple modules may be combined or integrated into another system, or some features can be ignored or not implemented. In addition, the mutual coupling or direct coupling or communication connection shown or discussed may be an indirect coupling or communication connection through some interfaces, modules, and may be electrical, mechanical or in other forms.

In the specific implementation of the above terminal device and network device, it should be understood that the processor can be a central processing unit (CPU), other general purpose processors, a digital signal processor (DSP), an application specific integrated circuit (ASIC), etc. The general purpose processor may be a microprocessor or any conventional processor, etc. The steps of the method disclosed in the present application may be directly embodied as being implemented by a hardware processor, or being implemented by a combination of hardware and software modules in the processor.

All or part of the steps to realize the above-mentioned method embodiments can be completed by hardware related to program instructions. The aforementioned program can be stored in a readable memory. When the program is executed, the steps including the above-mentioned method embodiments are executed; the aforementioned memory (storage medium) includes: a read-only memory (ROM), an random access memory (RAM), a flash memory, a hard disk, a solid state hard disk, a magnetic tape, a floppy disk, an optical disc and any combination thereof.

What is claimed is:

1. A method for configuring random access channel (RACH) resources, applied to a terminal device, wherein the method comprises:

receiving configuration information sent by a network device, wherein the configuration information is used to configure time domain resources and frequency domain resources of the RACH resources, the RACH resources correspond to multiple groups of frequency domain resources, the multiple groups of frequency domain resources do not overlap, and frequency domain resources corresponding to RACH resources on different time domain resources are different within each preset time, wherein the preset time represents a time length of a receiving window for a random access preamble; and sending the random access preamble to the network device on the RACH resources.

2. The method according to claim 1, wherein the configuration information is used to configure a group of time domain resources and multiple groups of frequency domain resources of the RACH resources.

3. The method according to claim 1, wherein the receiving the configuration information sent by the network device comprises:

receiving a plurality pieces of configuration information sent by the network device, wherein each configuration information of the plurality pieces of configuration information is used to configure a group of time domain resources and a group of frequency domain resources of the RACH resources;

wherein frequency domain resources configured by different pieces of configuration information in the plurality pieces of configuration information are different, and time domain resources configured by the different pieces of configuration information in the plurality pieces of configuration information are different.

4. The method according to claim 1, wherein each group of frequency domain resources in the multiple groups of frequency domain resources comprises a piece of continuous frequency domain resource segment, wherein the frequency domain resource segment comprises at least one frequency domain resource.

5. The method according to claim 1, wherein the time domain resources of the RACH resources comprise: a repetition period of the RACH resources and time domain positions of the RACH resources within the repetition period.

6. The method according to claim 5, wherein the configuration information further comprises: a corresponding relationship between the time domain resources and the frequency domain resources of the RACH resources;
wherein a RACH resource at each of the time domain positions corresponds to a piece of continuous frequency domain resource segment.

7. The method according to claim 4, wherein multiple frequency domain resource segments have a same length, or the multiple frequency domain resource segments have different lengths.

8. The method according to claim 4, wherein a number of frequency domain resource segments is related to at least one of the preset time and a distribution density of the RACH resources in a time domain, or the number of frequency domain resource segments is a maximum number of the RACH resources on different time domain resources within the preset time.

9. The method according to claim 1, wherein the sending the random access preamble to the network device on the RACH resources comprises:
determining a target resource from the RACH resources; and
sending the random access preamble to the network device on the target resource;
wherein the determining the target resource from the RACH resources comprises:
determining one time domain resource from configured time domain resources as a time domain resource of the target resource according to a time when the terminal device initiates a random access procedure;
determining a frequency domain resource segment corresponding to the time domain resource of the target resource; and
determining a frequency domain resource from the frequency domain resource segment as a frequency domain resource of the target resource.

10. A method for configuring random access channel (RACH) resources, applied to a network device, wherein the method comprises:
sending configuration information to the terminal device, wherein the configuration information is used to configure time domain resources and frequency domain resources of the random access channel RACH resources, the RACH resources correspond to multiple groups of frequency domain resources, the multiple groups of frequency domain resources do not overlap, and frequency domain resources corresponding to RACH resources on different time domain resources are different within each preset time, wherein the preset time represents a time length of a receiving window for a random access preamble; and
receiving the random access preamble sent by the terminal device.

11. The method according to claim 10, wherein after the receiving the random access preamble sent by the terminal device, the method further comprises:
determining, according to a frequency domain resource of a RACH resource corresponding to the random access preamble, a time domain resource of the RACH resource;
determining a time when the terminal device sends the random access preamble according to the time domain resource of the RACH resource; and
determining a timing advance of the terminal device according to the time when the terminal device sends the random access preamble and a time when the network device receives the random access preamble.

12. The method according to claim 10, wherein the configuration information is used to configure a group of time domain resources and a group of frequency domain resources of the RACH resources;
the configuration information further comprises a frequency hopping rule based on the group of frequency domain resources, wherein the frequency hopping rule is used to determine the multiple groups of frequency domain resources corresponding to the RACH resources.

13. The method according to claim 12, wherein the frequency hopping rule comprises a frequency hopping interval and a number of times of frequency hopping.

14. The method according to claim 10, wherein each group of frequency domain resources in the multiple groups of frequency domain resources comprises a piece of continuous frequency domain resource segment, wherein the frequency domain resource segment comprises at least one frequency domain resource.

15. The method according to claim 10, wherein the time domain resources of the RACH resources comprise: a repetition period of the RACH resources and time domain positions of the RACH resources within the repetition period.

16. The method according to claim 15, wherein the configuration information further comprises: a corresponding relationship between the time domain resources and the frequency domain resources of the RACH resources;
wherein a RACH resource at each of the time domain positions corresponds to a piece of continuous frequency domain resource segment.

17. The method according to claim 14, wherein multiple frequency domain resource segments have a same length, or the multiple frequency domain resource segments have different lengths.

18. The method according to claim 14, wherein a number of frequency domain resource segments is related to at least one of the preset time and a distribution density of the RACH resources in a time domain, or the number of frequency domain resource segments is a maximum number of the RACH resources on different time domain resources within the preset time.

19. A terminal device, wherein the terminal device comprises:
at least one processor, and
a memory communicatively connected with the at least one processor; wherein,
the memory stores instructions executable by the at least one processor, and the instructions are executed by the at least one processor, so that the at least one processor is configured to:
control an input interface to receive configuration information sent by a network device, wherein the configuration information is used to configure time domain resources and frequency domain resources of the random access channel (RACH) resources, the RACH resources correspond to multiple groups of frequency domain resources, the multiple groups of frequency domain resources do not overlap, and frequency domain resources corresponding to RACH resources on different time domain resources are different within each preset time, wherein the preset time represents a time length of a receiving window for a random access preamble; and control an output interface to send the random access preamble to the network device on the RACH resources.

20. A network device programed to execute the method according to claim 10, wherein the network device comprises:

at least one processor; and a memory communicatively connected with the at least one processor; wherein, the memory stores instructions executable by the at least one processor, and the instructions are executed by the at least one processor, so that the at least one processor is configured to execute said method.

\* \* \* \* \*